(12) United States Patent
Coombs et al.

(10) Patent No.: US 12,365,210 B2
(45) Date of Patent: Jul. 22, 2025

(54) PNEUMATIC CONTROL SYSTEM FOR VEHICLE TIRE INFLATION

(71) Applicant: AKTV8 LLC, Wixom, MI (US)

(72) Inventors: Josh Coombs, Wixom, MI (US); Gary Meyers, Wixom, MI (US)

(73) Assignee: AKTV8 LLC, Wixom, MI (US)

( * ) Notice: Subject to any disclaimer, the term of this patent is extended or adjusted under 35 U.S.C. 154(b) by 0 days.

(21) Appl. No.: 18/901,747

(22) Filed: Sep. 30, 2024

(65) Prior Publication Data
US 2025/0018759 A1 Jan. 16, 2025

Related U.S. Application Data

(63) Continuation of application No. 18/097,166, filed on Jan. 13, 2023, now Pat. No. 12,103,345, which is a continuation-in-part of application No. 17/141,185, filed on Jan. 4, 2021, now Pat. No. 11,571,941, which is a continuation of application No. 16/289,371, filed on Feb. 28, 2019, now Pat. No. 10,882,374, which is a continuation of application No. 15/712,995, filed on Sep. 22, 2017, now Pat. No. 10,259,284, which is a
(Continued)

(51) Int. Cl.
*B60G 17/015* (2006.01)
*B60G 17/052* (2006.01)
*F15B 13/08* (2006.01)

(52) U.S. Cl.
CPC ....... *B60G 17/0155* (2013.01); *B60G 17/052* (2013.01); *B60G 17/0523* (2013.01); *B60G 17/0526* (2013.01); *F15B 13/0814* (2013.01); *F15B 13/0853* (2013.01); *B60G 2202/152* (2013.01); *B60G 2206/0116* (2013.01); *B60G 2206/80* (2013.01); *B60G 2206/81012* (2013.01); *B60G 2206/91* (2013.01); *B60G 2400/51222* (2013.01); *B60G 2401/172* (2013.01); *Y10T 137/877* (2015.04); *Y10T 137/87885* (2015.04)

(58) Field of Classification Search
None
See application file for complete search history.

(56) References Cited

U.S. PATENT DOCUMENTS 11,505,013 B2 * 11/2022 Henry ................. B60C 23/002

FOREIGN PATENT DOCUMENTS

| CN | 85104667 A | * | 12/1986 | ........... B60C 23/003 |
| DE | 202015105860 U1 | * | 3/2017 | ........... B60C 23/003 |
| DE | 102020216212 A1 | * | 6/2022 | ........... B60C 23/001 |

* cited by examiner

*Primary Examiner* — Faye M Fleming
(74) *Attorney, Agent, or Firm* — William H. Honaker; Dickinson Wright PLLC

(57) ABSTRACT

A tire inflation control system for a vehicle includes: a manifold defining: a channel configured to be connected to a fluid source, and a discharge port configured to be connected to one or more tires of a vehicle; an actuator configured to selectively control fluid communication between the channel and the discharge port; a pressure sensor configured to measure a fluid pressure in the discharge port; and an electronics module in communication with the pressure sensor and configured to command the actuator to selectively control fluid communication between the channel and the discharge port and based on the fluid pressure in the discharge port, and to thereby control inflation of the one or more tires connected to the discharge port.

20 Claims, 19 Drawing Sheets

Related U.S. Application Data continuation of application No. 14/971,520, filed on Dec. 16, 2015, now Pat. No. 9,834,056.

(60) Provisional application No. 62/195,083, filed on Jul. 21, 2015, provisional application No. 62/119,740, filed on Feb. 23, 2015, provisional application No. 62/092,723, filed on Dec. 16, 2014.

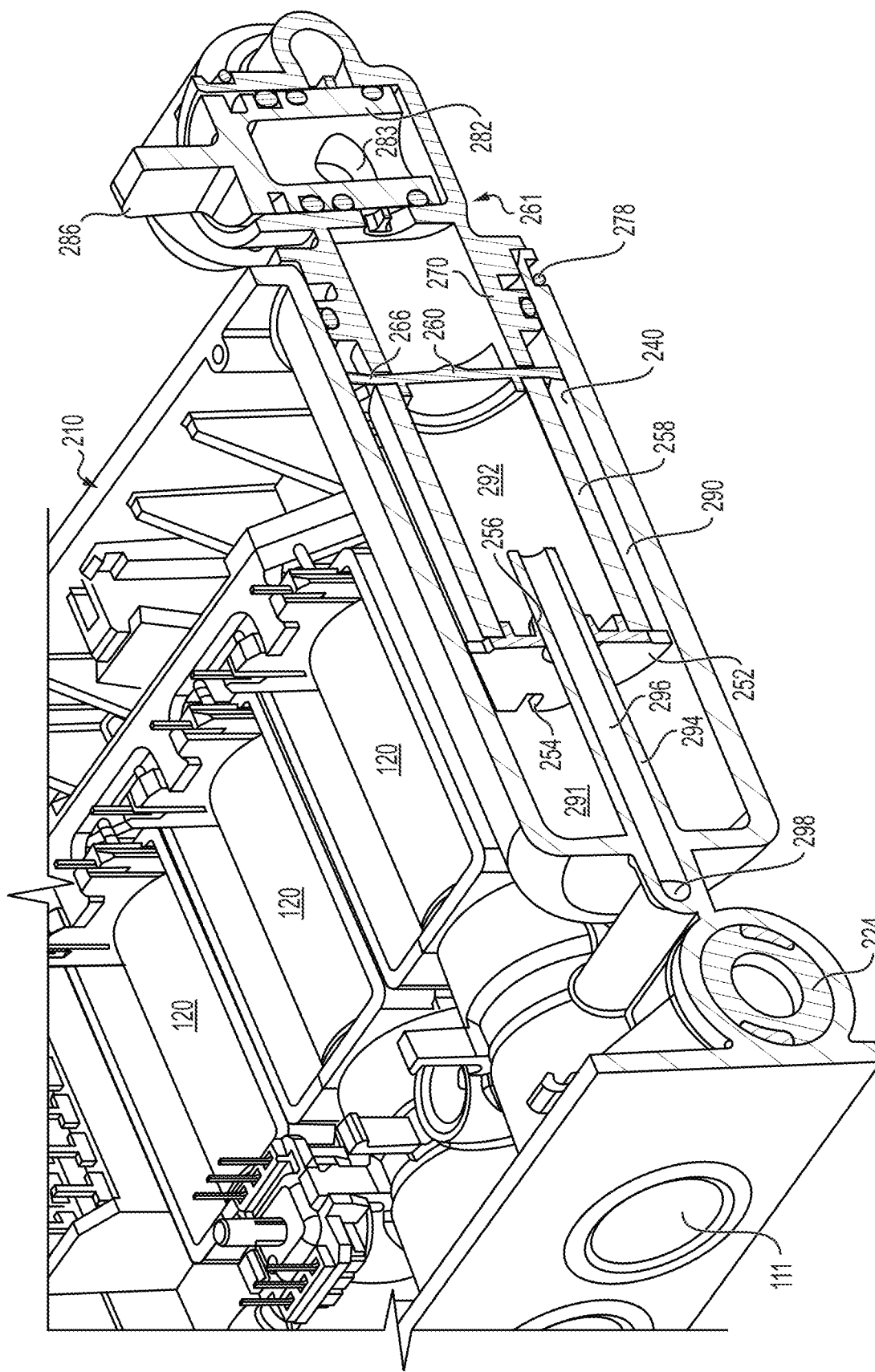

PNEUMATIC CONTROL SYSTEM FOR VEHICLE TIRE INFLATION

CROSS REFERENCE TO RELATED APPLICATIONS

This U.S. utility patent application is a continuation of U.S. application Ser. No. 18/097,166 filed 13 Jan. 2023, which is a continuation-in-part of U.S. application Ser. No. 17/141,185 filed 4 Jan. 2021, now U.S. Pat. No. 11,571,941, which is a continuation of U.S. application Ser. No. 16/289,371 filed 28 Feb. 2019, now U.S. Pat. No. 10,882,374, which is a continuation of U.S. application Ser. No. 15/712,995 filed 22 Sep. 2017, now. U.S. Pat. No. 10,259,284, which is a continuation of U.S. application Ser. No. 14/971,520, filed 16 Dec. 2015, now U.S. Pat. No. 9,834,056, which claims the benefit of U.S. Provisional Application Ser. No. 62/092,723 filed 16 Dec. 2014, U.S. Provisional Application Ser. No. 62/119,740 filed 23 Feb. 2015, and U.S. Provisional Application Ser. No. 62/195,083 filed 21 Jul. 2015, each of which is incorporated in its entirety herein by this reference.

TECHNICAL FIELD

This invention relates generally to vehicle tire inflation, and more specifically to a new and useful pneumatic control system for tire inflation on a vehicle.

BACKGROUND

Pneumatic control systems may have a variety of applications on a vehicle, including for suspension systems relying on air springs and for a central tire inflation system. Electronic control systems and software have recently been developed to provide automation and control (e.g., closed-loop control, open-loop control) to vehicle-based pneumatic control systems. However, however, such systems and methods suffer from a number of drawbacks. In particular, many systems are excessively complex (e.g., systems that require numerous machining operations to form and assemble, need complicated arrangements of gaskets and seals to function properly, etc.), highly specified (e.g., systems that are made for a specific vehicle configuration and/or lack ability to be reconfigured), and expensive to manufacture (e.g., systems of predominantly metal construction that are expensively machined, systems with high part counts that are intensively assembled, etc.).

Furthermore, construction of robust electronic control units, including complex manifolds, that can be manufactured at a low per-unit cost is particularly challenging. Challenges include: integration of sub-system components (e.g., actuators, electronic control systems, etc.) with the manifold; fabrication of the manifold; retooling of the electronic control unit for various customer applications without unduly specializing the assembly process; and reducing the number of operations necessary to electronically couple the internal components of the electronic control units.

SUMMARY

The present disclosure provides a tire inflation control system for a vehicle. The tire inflation control system includes a manifold. The manifold defines: a channel configured to be connected to a fluid source, and a discharge port configured to be connected to one or more tires of a vehicle. The tire inflation control system also includes an actuator configured to selectively control fluid communication between the channel and the discharge port, and an electronics module in communication with the pressure sensor. The electronics module is configured to command the actuator to selectively control fluid communication between the channel and the discharge port and based on the fluid pressure in the discharge port, and to thereby control inflation of the one or more tires connected to the discharge port.

In some embodiments, the tire inflation control system further includes a second pressure sensor configured to measure a fluid pressure in the channel, and the electronics module is in communication with the second pressure sensor and is configured to command the actuator to selectively control fluid communication between the channel and the discharge port further based on the fluid pressure in the channel.

In some embodiments, the manifold further defines an expansion chamber having a chamber axis and extending between the fluid source and the channel, and the inflation control system further includes a filter member disposed in the expansion chamber.

In some embodiments, the filter member has a tubular shape disposed coaxially with the chamber axis.

In some embodiments, the tire inflation control system further includes a filter input disc that covers an axial end of the filter member.

In some embodiments, the actuator includes a solenoid valve, and the inflation control system further includes a second solenoid valve configured to selectively control fluid communication between the channel and a second discharge port.

In some embodiments, the manifold further defines: a first port and a second port, each of the first port and the second port defining a flow axis extending between a first and second end and a receiving region at the second end, the first and second ports are arranged with the respective flow axes in a common plane, the channel intersects the first port and the second port between the first and second ends of each port, and the solenoid valve and the second solenoid valve are coaxially arranged with the first and second ports, respectively.

In some embodiments, the manifold further defines: a first port and a second port, each of the first port and the second port defining a flow axis extending between a first and second end and a receiving region at the second end, wherein the first and second ports are arranged with the respective flow axes in a common plane, and the electronics module is arranged parallel the common plane.

In some embodiments, the actuator includes a solenoid valve having a connector, the pressure sensor includes electrical leads, and the electronics module is configured to receive and electrically couple to the electrical leads of the pressure sensor and the connectors of the solenoid valve.

The present disclosure provides a tire inflation control system for a vehicle. The tire inflation control system includes a tire and a manifold. The manifold defines a channel configured to be connected to a fluid source, and a discharge port in fluid communication with the tire. The tire inflation control system also includes: an actuator configured to selectively control fluid communication between the channel and the discharge port, a pressure sensor configured to measure a fluid pressure in the discharge port, and an electronics module in communication with the pressure sensor. The electronics module is configured to command the actuator to selectively control fluid communication between the channel and the discharge port based on the fluid pressure in the discharge port, and to thereby control inflation of the tire.

In some embodiments, the tire inflation control system further includes a second pressure sensor configured to measure a fluid pressure in the channel, and the electronics module is in communication with the second pressure sensor and the electronics module is configured to command the actuator to selectively control fluid communication between the channel and the discharge port further based on the fluid pressure in the channel.

In some embodiments, the manifold further defines an expansion chamber having a chamber axis and extending between the fluid source and the channel, and the inflation control system further includes a filter member disposed in the expansion chamber.

In some embodiments, the actuator includes a solenoid valve, and the inflation control system further includes a second solenoid valve configured to selectively control fluid communication between the channel and a second discharge port.

In some embodiments, the manifold further defines: a first port and a second port, each of the first port and the second port defining a flow axis extending between a first and second end and a receiving region at the second end, wherein the first and second ports are arranged with the respective flow axes in a common plane, the channel intersects the first port and the second port between the first and second ends of each port, and the solenoid valve and the second solenoid valve are coaxially arranged with the first and second ports, respectively.

In some embodiments, the manifold further defines: a first port and a second port, each of the first port and the second port defining a flow axis extending between a first and second end and a receiving region at the second end, wherein the first and second ports are arranged with the respective flow axes in a common plane, and the electronics module is arranged parallel the common plane.

The present disclosure provides a tire inflation controller for a vehicle. The tire inflation controller includes a manifold. The manifold defines: a channel configured to be connected to a fluid source, a pressure sensor port, and a discharge port configured to be connected to one or more tires of a vehicle. The tire inflation controller also includes: an actuator configured to selectively control fluid communication between the channel and the discharge port; a pressure sensor arranged within the pressure sensor port and configured to measure a fluid pressure in the discharge port; and an electronics module. The electronics module is in communication with the pressure sensor and configured to command the actuator to selectively control fluid communication between the channel and the discharge port and based on the fluid pressure in the discharge port, and to thereby control inflation of the one or more tires connected to the discharge port.

In some embodiments, the tire inflation controller further includes a second pressure sensor configured to measure a fluid pressure in the channel, and the electronics module is in communication with the second pressure sensor and is configured to command the actuator to selectively control fluid communication between the channel and the discharge port further based on the fluid pressure in the channel.

In some embodiments, the manifold further defines: a first port and a second port, each of the first port and the second port defining a flow axis extending between a first and second end and a receiving region at the second end, wherein the first and second ports are arranged with the respective flow axes in a common plane, and the electronics module is arranged parallel the common plane.

In some embodiments, the actuator includes a solenoid valve, and the tire inflation controller further includes a second solenoid valve configured to selectively control fluid communication between the channel and a second discharge port.

In some embodiments, the electronics module is electrically connected to each of the pressure sensor and the actuator via connectors configured to maintain mechanical and thermal isolation between the actuator and the electronics module.

These and other aspects of the present disclosure are disclosed in the following detailed description of the embodiments, the appended claims, and the accompanying figures.

BRIEF DESCRIPTION OF THE FIGURES

Further details, features and advantages of designs of the invention result from the following description of embodiment examples in reference to the associated drawings.

FIG. 22C depicts a perspective view of the second manifold of FIG. 22A, with a cut-away showing internal details of the filter assembly.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
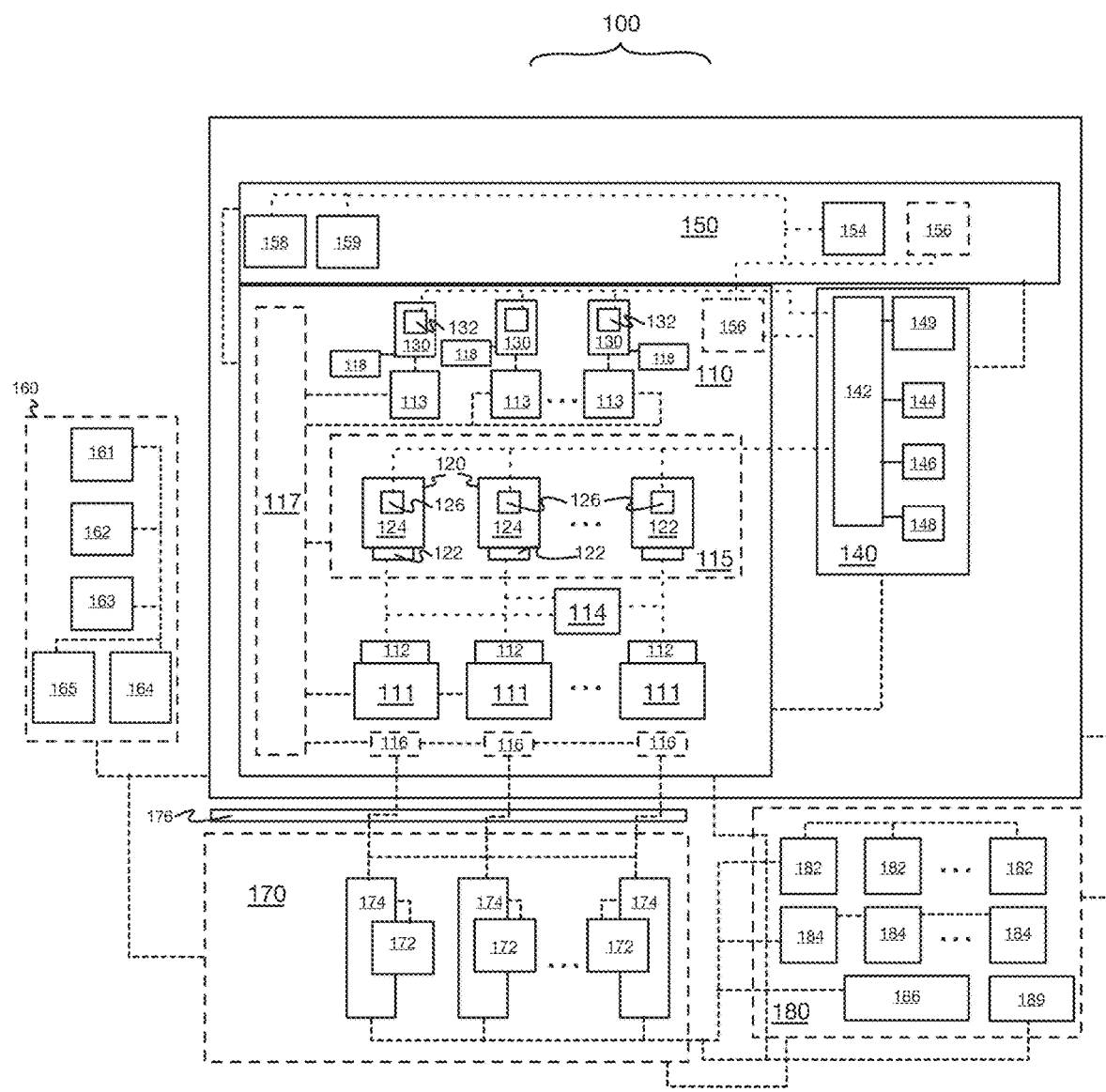
FIG. 1 depicts a schematic of a first embodiment of the system.

As shown in FIG. 1, an embodiment of an electronically controlled air suspension system 100 includes: a manifold 110, including a discharge port 111, pressure sensor port 113, a channel 114, and a cavity 115; an actuator 120; a pressure sensor 130 arranged in the pressure sensor port 113, the pressure sensor 130 including a connector 132; an electronics module 140, including an electronics substrate 142, the electronics substrate 142 arranged to enclose the actuator 120 and pressure sensor 130 within the manifold 110; and a cover 150, coupled to the manifold 110 and cooperatively enclosing the actuator 120, the pressure sensor 130, and the electronics module 140. As described in more detail below, one or more variations of the system 100 can omit one or more of the above elements, as well as provide a plurality of one or more of the above elements, in providing a suitable electronically controlled air suspension system 100.

Figure 2A:
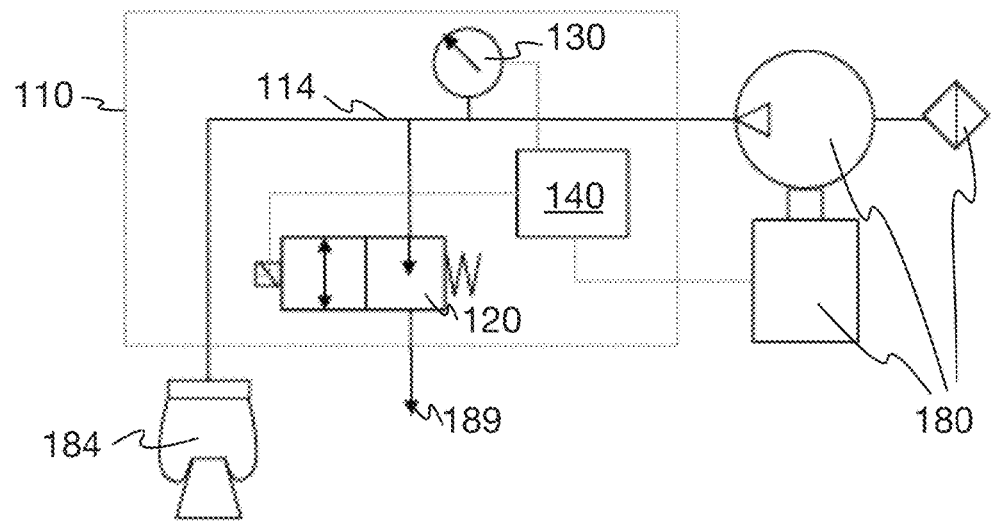
FIG. 2A depicts a schematic representation of a functional relationship between the system components of a second embodiment of the system.
Figure 2B:
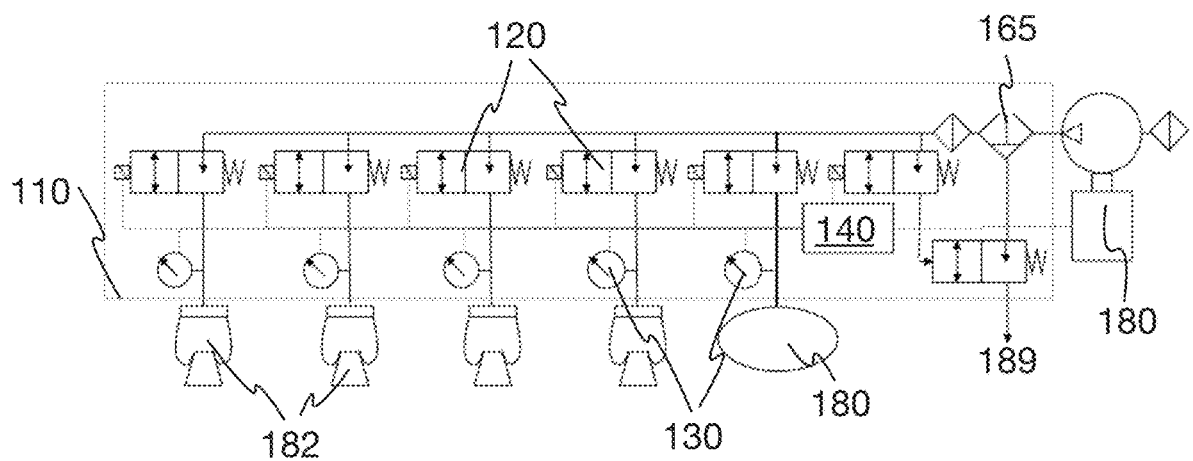
FIG. 2B depicts a schematic representation of a functional relationship between the system components of a third embodiment of the system.

The system 100 functions to control air flow to and from services by electronically controlling one or more actuators 120 to direct pressurized air through a manifold 110. The system 100 can also function as a command module for the control of one or more movable obstructions 172 of a second stage manifold 170. Examples of services to and from which air flow can be controlled include: a set of air springs 182, active or semi-active dampers 184, an air compressor, a reservoir of compressed air, a hose, a second stage manifold 170, or any other suitable system, subsystem, or component requiring a controllable source or sink of compressed air. Example configurations of the system 100 alongside various services and external systems 180 are shown in FIGS. 2A and 2B. The system 100 can be used in: a central tire inflation system, air control system for recreational vehicle systems (e.g., slideouts, central locking, jacking systems, door opening and/or closing systems), active braking systems (e.g., pneumatic braking, hydraulic braking), vehicle stability control systems, medical devices (e.g., alternating pressure mattresses, seatpads for wheelchairs, blood-circulation enhancers), or in any other suitable application. In variations, the system 100 can include one or more of the services described above. The system 100 can additionally or alternatively function to maintain a particular pressure value, set of pressure values, or range of pressure values in one or more of the services described above. The system 100 can additionally or alternatively function to provide a variable set of internal control and actuation components based upon the specific needs of a user or service utilizing the system 100.

As such, the system 100 can be configured for one or more of the following: providing a flexible and/or reconfigurable arrangement of internal components that can be populated in the system according to customer/user needs; mounting to any suitable vehicle employing an air suspension system; providing a common plane through which the connector(s) 126, connector(s) 132, and/or external connector(s) 149 perpendicularly pass to enable single-operation coupling of the pressure sensor(s) 130 and the actuator(s) 120 to the electronics module 140; arranging the actuator(s) 120 coaxially with the discharge port(s) 111 to enable a larger electronics substrate 142 to be used, a decreased package size of the system 100, an injection-moldable cross section of the manifold 110, and decreased cost and complexity of the system 100; and selectively removing material between the pressure sensor port(s) 113 and the discharge port(s) 111 and/or the channel 114 to provide access between various static pressures of portions of the system 100 and the pressure sensor(s) 130. In one variation, all the pins (e.g., connectors) of the various components (e.g., external connector 149, actuator 120, pressure sensor 130) extend in a common direction from their respective positions within the manifold 110 towards a common plane. The architecture of this variation enables PCB-to-connector coupling and PCB-to-manifold coupling in a single assembly step. The architecture additionally enables single-pass soldering of the connectors to the PCB. A single soldering step can reduce stress on the printed circuit board (e.g., stress resulting from uneven thermal loading, mechanical loading, etc.) and lead to longer product lifetime and enhanced robustness. The system 100 can also function to be conveniently and easily manufactured and/or retooled.

In variations, the system 100 is configured to maximize the number of injection-moldable parts of the system 100, including the manifold 110, which is preferably of unitary molded construction. However, the system can be otherwise manufactured.

1. Applications and Specific Examples

As noted above and as shown in FIG. 7, the system 100 can be integrated with or include a suspension system of a vehicle 400. This can include a number of external systems 180, including one or more air springs 182, active or semi-active dampers 184, vehicle mounting mechanisms 186, and exhaust ports 189. However, the suspension system can include any other suitable component. The suspension system can be an air suspension system, or be any other suitable suspension system. An air spring 182 can be a bag, cylinder, bellows, or similar structure that can expand (lengthen, stiffen, harden) or contract (shorten, soften, flex) when air is either pumped in or removed, respectively. However, the air spring can be a piston or have any other suitable configuration. An air spring 182 can function to provide a smooth and consistent ride quality to a vehicle 400, or in some applications (e.g., a sport suspension) provide dynamic, wide range-of-motion articulation to some vehicle suspension. An air spring 182 can also function as a service requiring a source of compressed air, to be provided by the system 100. An air spring 182 can also function as a source of compressed air that must be exhausted to atmospheric pressure, which can be controlled and directed by the system 100.

The system 100 can simultaneously control one or more air springs 182. When the system 100 controls multiple air springs 182, the system 100 can individually control each air spring 182, control a first set of air springs 182 based on the operation parameters of a second set of air springs 182, or otherwise control air spring operation. In a first variation, the system 100 can fluidly isolate the air springs 182 connected to the system from each other (e.g., fluidly isolate a first air spring from a second air spring). In a second variation, two air springs 182 can be connected together through the system 100, causing pressure to equalize between the two air springs 182, providing an efficient means of suspension control for extremely uneven or irregular terrain. However, the system 100 can selectively or otherwise form any other suitable fluid configuration between the air springs 182. An active or semi-active damper 184 is typically of similar mechanical construction as an air spring, but with the preferred function of dampening vibration that can be experienced by a vehicle 400 during normal operation (e.g., driving on a paved surface). However, the active or semi-active damper can be constructed, connected to the system 100, or operated in any other suitable manner.

A vehicle mounting mechanism 186 functions to affix the system 100 to a vehicle 400. A vehicle mounting mechanism 186 can include one or more brackets, bolts, fasteners, straps, clips, or similar devices that couple the system 100 to the vehicle 400. The vehicle mounting mechanism 186 can additionally or alternatively include a set of mating surfaces, some of which are constituted by portions of the system 100 (e.g., a through-hole in the manifold 110) and some of which are defined by portions of the vehicle 400 (e.g., a bracket with a mating through-hole, to which the system 100 can be bolted, attached to a strut support of the vehicle 400). As a further alternative, the vehicle mounting mechanism 186 can include a receiving manifold to direct airflow to and/or from the system 100, into which the system 100 is inserted and to which each of the discharge ports 111 of the manifold 110 is connected. The receiving manifold preferably includes one or more tubes that are each coupleable to a corresponding one of the discharge ports 111 of the manifold 110, each of the one or more tubes fluidly connected to a service requiring pressurized air. Alternatively, the receiving manifold can define any suitable directed flow pattern. Alternatively, the vehicle mounting mechanism 186 can be any suitable mounting mechanism.

In a first specific example, the system 100 provides two controllable pressure lines, although the manifold 110 and electronics module 140 are configured to provide up to three controllable pressure lines in alternative configurations. The example system can include three of the discharge ports 111 and two actuators 120. The first actuator 120 is emplaced in (e.g., arranged within) the cavity 115 of the manifold 110 and coaxially aligned with a first one of the discharge ports 111, and the second actuator 120 is likewise emplaced and coaxially aligned with an adjacent second one of the discharge ports 111. The third one of the discharge ports 111 can remain unused, and can remain open to the cavity 115 or be sealed by a cap or other sealing mechanism. The system can additionally include two pressure sensor ports 113, each located between two adjacent discharge ports 111 of the three discharge ports 111 (e.g., the first pressure sensor port 113 between the first and second discharge ports 111, the second pressure sensor port 113 between the second and third discharge ports 111). The system can include a single pressure sensor 130, arranged within the first pressure sensor port 113 (e.g., the pressure sensor port 113 positioned between the two discharge ports 111 with corresponding actuators 120).

In a second specific example, the system 100 can be substantially similar to the first specific example, and additionally include a first air spring connected to the first discharge port 111, a second air spring connected to the second discharge port 111, and an exhaust connected to the third discharge port 111. As such, the first air spring, the second air spring, and the exhaust are "services" connected to the system 100. The system can additionally include a source of compressed air connected to an input of the system 100. The actuators 120 are configured to selectively fluidly connect and disconnect the services to one another and/or to the source of compressed air, with all airflow occurring within the manifold 110. In a first configuration, the first air spring can be fluidly connected to the second air spring, resulting in pressure equalization between the first and second air springs. In a second configuration, the first air spring can be fluidly connected to the source of compressed air, causing the first air spring to expand as its internal pressure is increased. In a third configuration, the first and/or second air spring can be fluidly connected to the exhaust, causing the first and/or second air spring to contract as its internal pressure is reduced. The first air spring, the second air spring, and the exhaust can alternatively be variously connected to and disconnected from one another, as well as to and from other connected external services and systems, in any other suitable manner.

Figure 9:
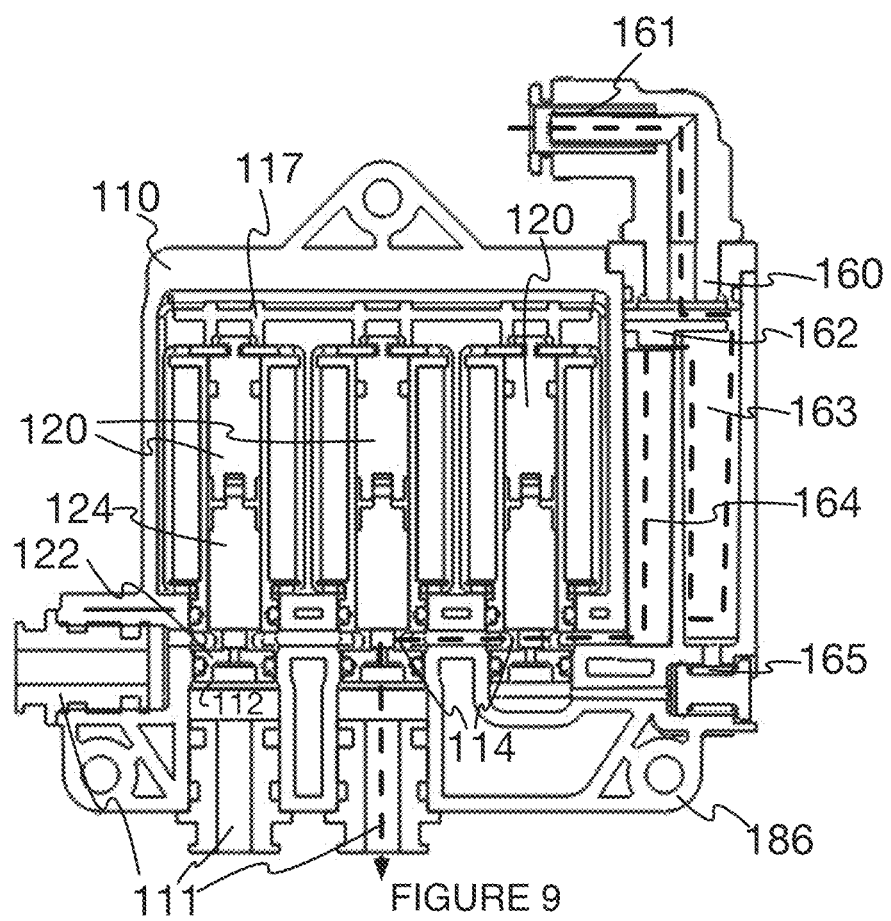
FIG. 9 depicts an example flow pathway of a fluid particle through the fifth embodiment of the system.

As shown in FIG. 9, an example flow path through an example embodiment of the system 100 includes an air particle flowing from an air compressor through an input 161 of a filter 160. The air particle then strikes the filter plate 162, and is divested of dust particles in the air particle before passing into the expansion chamber 163. Upon expansion, water vapor in the air particle condenses into a droplet, which adheres to the side wall of the expansion chamber 163 and collects in a separate portion of the expansion chamber 163. The air particle turbulently flows through the expansion chamber 163 and into the filter element 164, and follows a tortuous path through the filter element where it is divested of as much remaining water vapor as possible. The air particle then enters the channel 114, and then into a first discharge port 111 with a corresponding first actuator 120 that is in an open position (i.e., in a position that fluidly connects the channel 114 and the discharge port 111). The air particle then travels through a compressed air line connected to the discharge port 111, and then to an air spring 182 that is connected to the compressed air line, raising the internal pressure of the air spring 182. A second actuator 120 is then actuated from a closed position (i.e., a position that prohibits fluid communication between the channel 114 and a discharge port 111 corresponding to the actuator 120) into the open position, and the air particle flows from the air spring 182, through the compressed air line, into the first discharge port 111 and then the channel 114 before entering the second discharge port 111 (corresponding to the second actuator 120) and subsequently a second air spring 182. However, any suitable fluid (e.g., air, other gasses, Newtonian fluids, non-Newtonian fluids, etc.) can flow from a fluid source (e.g., the ambient environment, reservoir, etc.) through the system along any other suitable fluid path.

2. System

Figure 3:
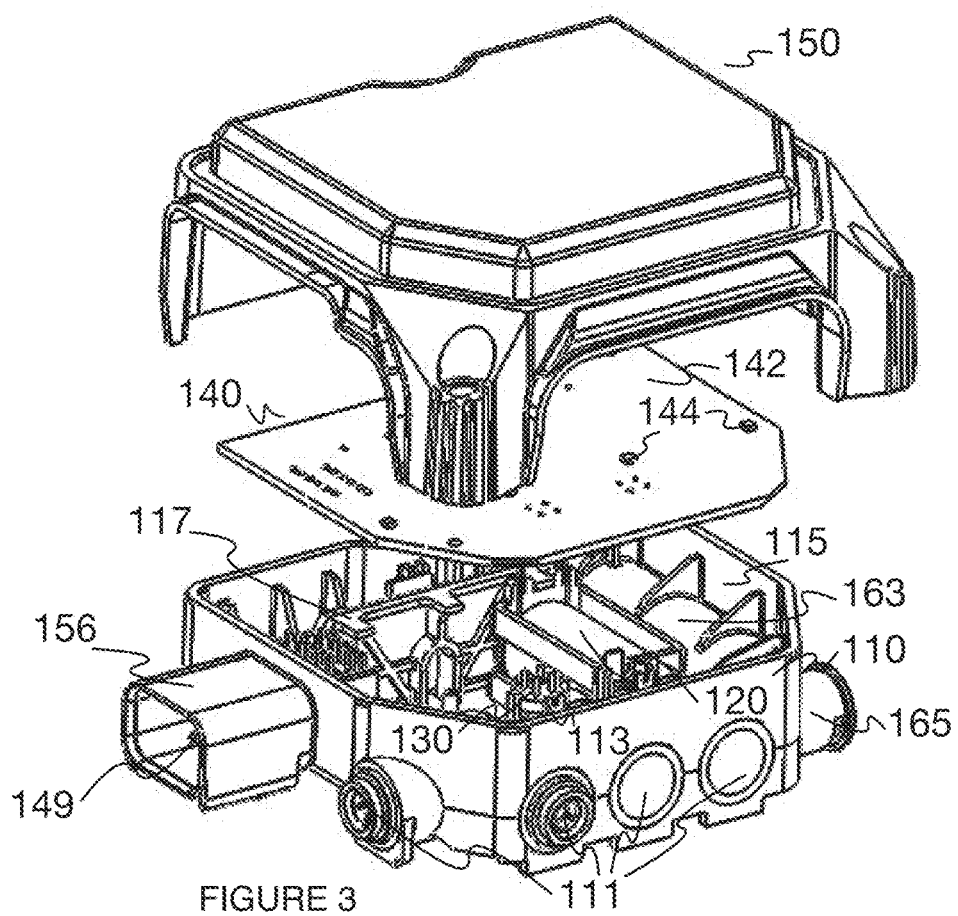
FIG. 3 depicts an exploded view of a fourth embodiment of the system.
Figure 16:
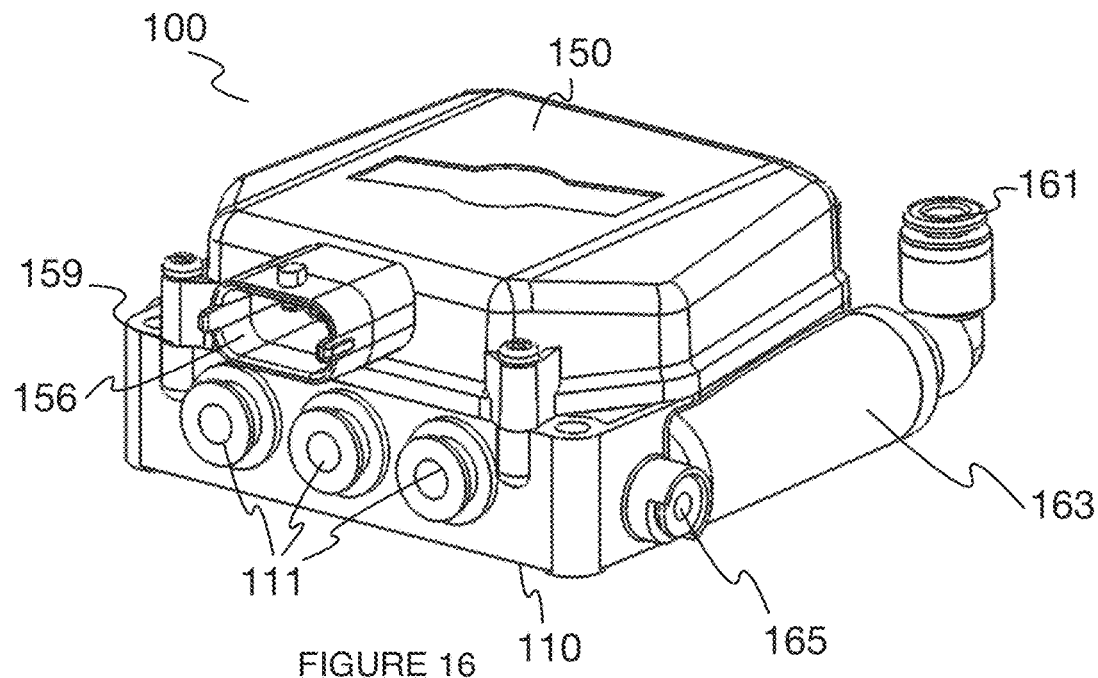
FIG. 16 depicts a perspective view of an embodiment of the system, including fittings emplaced in the discharge ports and the input of the filter.

As noted above and as shown in FIGS. 1, 3, and 4, an embodiment of the system 100 includes: a manifold 110, defining: a first and second discharge port 111; a channel 114; a cavity 115; and a pressure sensor port 113. The system 100 can additionally include an actuator 120, a pressure sensor 130 arranged within the pressure sensor port 113, an electronics module 140, an integrated filter 160, a second stage manifold 170, and/or any other suitable component. The system 100 is preferably assembled into a self-contained unit, as shown by example in FIG. 16, but can alternatively be configured in any other suitable manner.

2.1 Manifold

Figure 4:
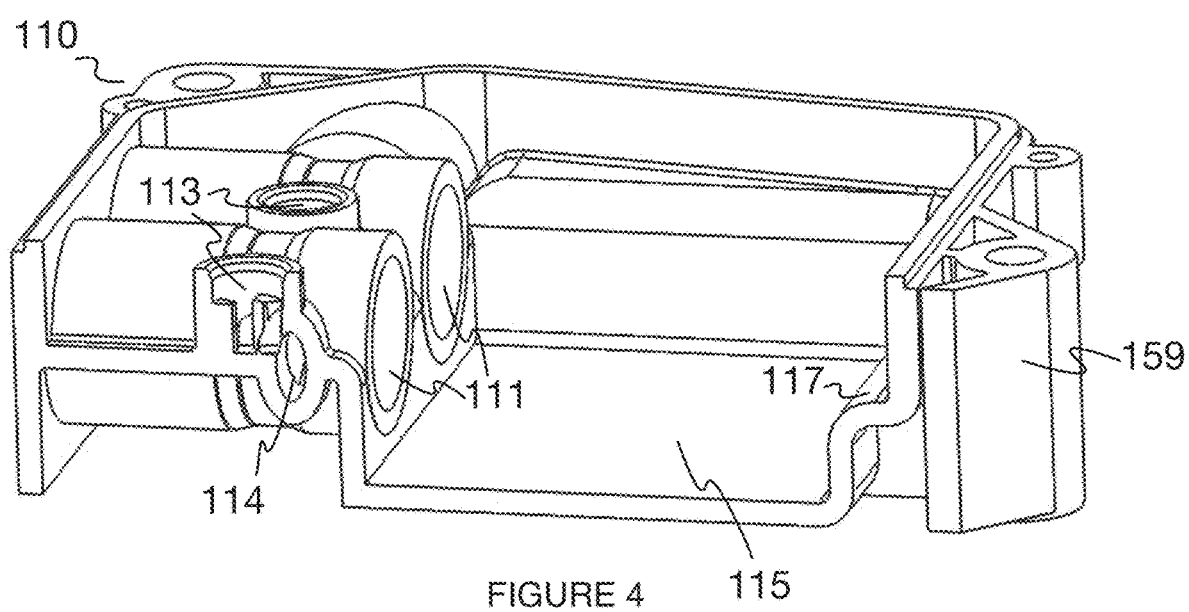
FIG. 4 depicts a cutaway view of a first embodiment of the manifold.

As shown in FIG. 4, the manifold 110 preferably defines a discharge port 111, a pressure sensor port 113, a channel 114, and a cavity 115. The manifold 110 functions to direct fluid flow between one or more inputs and one or more outputs, preferably in cooperation with the actuator(s) 120, but alternatively independently or with any other suitable component. The manifold 110 also functions to contain (e.g., enclose, mechanically protect) system components, such as the actuator(s) 120 and the pressure sensor(s) 130. The manifold 110 can also function as a substrate (e.g., mounting point) for attachment of system components (e.g., the electronics module 140, the cover 150, etc.) or external components (e.g., a vehicle 400). The manifold 110 is preferably made of a thermoplastic (e.g., nylon or polyvinyl toluene with a 30% glass fill), but can alternatively be made of another synthetic or natural polymer, metal, composite material, or any other suitable material. The manifold 110 is preferably injection-molded, but can alternatively be milled out of a single block of material (e.g., metal, plastic), cast out of metal, composed of separate sub-components which are fastened together, or made using any combination of these or other suitable manufacturing techniques. One or more variations of the manifold 110 can also omit one or more of the above elements, as well as provide a plurality of one or more of the above elements, in providing a suitable manifold 110.

Figure 5:
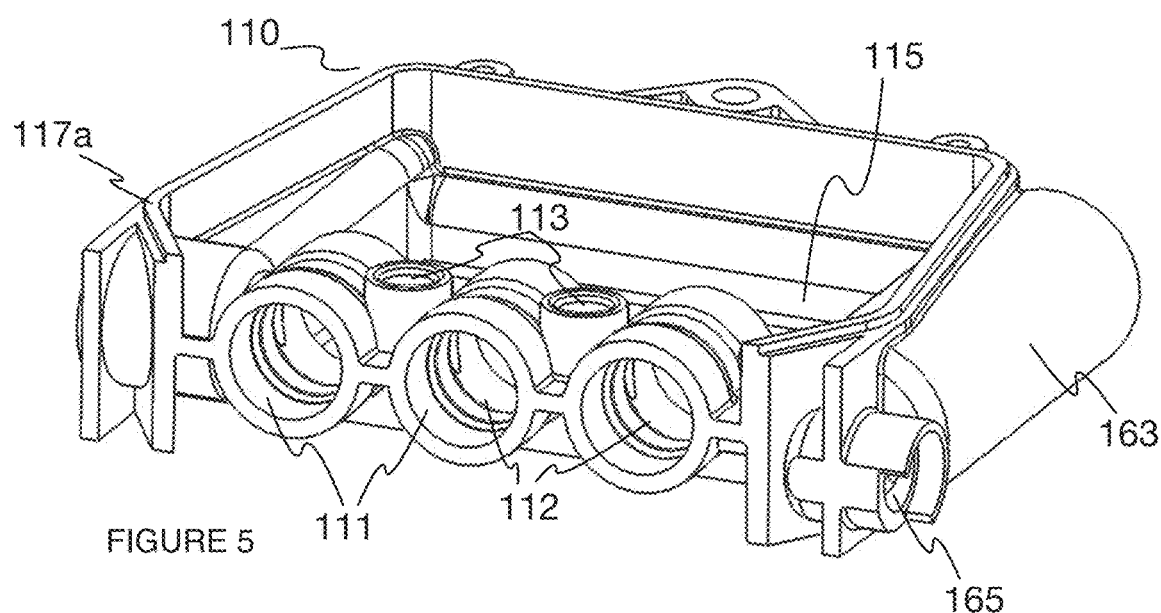
FIG. 5 depicts a perspective view of the first embodiment of the manifold.

In some variations, the manifold 110 can include webbing between one or more molded-in discharge ports 111, to enhance the injection-moldability of the manifold 110 while maintaining the structural integrity of the pressurized portions of the manifold 110, including the discharge ports 111. As shown in FIG. 5, the cross section of the manifold 110 can also include a ridge 117a along an outer edge of the manifold 110, which can facilitate sealing of the manifold 110 to the cover 150. However, the manifold 110 can include any other suitable set of features.

2.1.1 Ports

The manifold 110 preferably includes one or more discharge ports 111. The discharge port 111 functions to fluidly connect a single attached service to the manifold 110. The discharge port 111 can also function to receive an external fitting (e.g., a threaded quick-release compressed-gas fitting) that facilitates fluid connection of the discharge port 111 to an attached service. The discharge port 111 can additionally function to fluidly connect a system inlet (e.g., the filter) to the service, a second service to the service, or provide any other suitable fluid connection between a first and second endpoint. The discharge port 111 preferably defines an open first end, open second end, and a flow axis extending between the first and second ends. However, the first end and/or second end can be closed or otherwise configured. The discharge port 111 preferably defines a straight flow axis, but can alternatively define a curved flow path, a branched flow path (e.g., with at least a third end in addition to the first and second end), or any other suitable path along which air can flow through the discharge port 111. In variations including a plurality of discharge ports 111, the flow axis of each discharge port 111 is preferably parallel to each of the other flow axes of each of the other discharge ports 111. In one example, the first and second discharge ports 111 are arranged with the respective flow axes sharing a common plane (port plane). However, multiple discharge ports 111 can be arranged offset from each other, at a non-zero angle to each other, or be arranged in any other suitable configuration.

The discharge port 111 can additionally define a receiving region 112, which functions to seal against the barrel 122 of each actuator 120, which can prevent uncontrolled fluid communication between the channel 114 and the discharge port 111. The receiving region 112 is preferably a constriction of the discharge port 111 (e.g., a constriction of the inner port diameter), but can alternatively be a substantially flat ridge, boss, or any other suitable receiving surface or region of the discharge port 111 extending radially inward into the port lumen. The receiving region 112 is preferably positioned at or near the second end of the discharge port 111 (e.g., between the first and second ends, proximal the second end), but can alternatively be positioned in any suitable location along the flow axis of the discharge port 111. The discharge port 111 can include one or more receiving regions 112 along the port length.

2.1.2 Pressure Sensor Ports

The manifold 110 preferably includes one or more pressure sensor ports 113, which function to receive one or more pressure sensors 130. The pressure sensor ports 113 can additionally function to fluidly connect the pressure sensors 130 with at least one of the discharge ports 111 and/or the channel 114. The pressure sensor port 113 can be fluidly connected to the first discharge port 111, second discharge port 111, channel 114, or to any other suitable lumen by a fluid connection defined through the manifold thickness, wherein the fluid connection can be selectively formed after manifold manufacture (e.g., by a vertical drilling operation to remove the interposing manifold thickness), formed during manifold manufacture (e.g., with an injection molding insert), or otherwise formed at any other suitable time. The remaining manifold thickness preferably separates (e.g., fluidly isolates) the pressure sensor port 113 from the other lumens. In some variations, the pressure sensor port 113 can only be simultaneously fluidly connected to one of the discharge ports 111 or the channel 114. Alternatively, the pressure sensor port 113 can be simultaneously fluidly connected to multiple of the discharge ports 111 and/or channel 114. However, the pressure sensor port 113 can otherwise selectively permit pressure sensor access to one or more of the discharge ports 111 or channel 114.

Figure 6A:
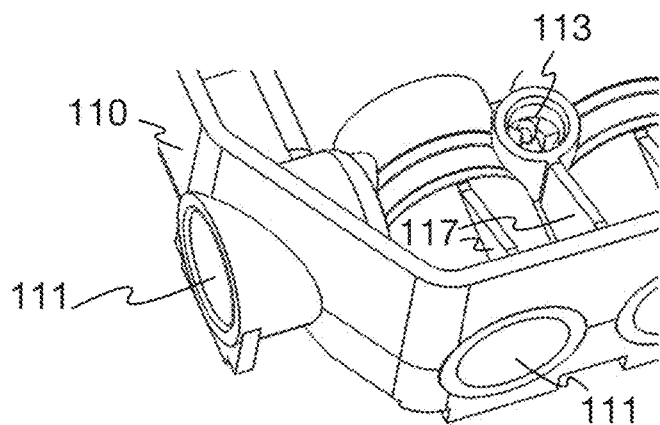
FIG. 6A depicts a perspective view of a variation of the pressure sensor port of the first embodiment of the manifold.
Figure 6B:
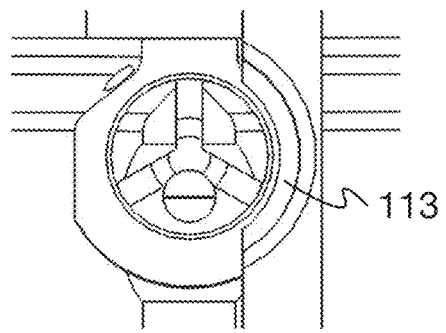
FIG. 6B depicts a top-down view of a variation of the pressure sensor port of the first embodiment of the manifold.

The pressure sensor port 113 can define a sensor insertion axis, along which a pressure sensor 130 can be inserted. The pressure sensor port 113 preferably includes a set of walls extending along the sensor insertion axis (e.g., extending perpendicular the port axes), but can alternatively remain substantially flush with the discharge port 111 exterior. The walls preferably do not extend beyond the discharge port 111 apex, but can alternatively extend beyond the discharge port 111 apex or extend any other suitable distance. The pressure sensor port 113 is preferably arranged adjacent a discharge port 111 (e.g., with the sensor insertion axis offset from the port central axis), more preferably overlapping a discharge port 111, but can alternatively be arranged over a discharge port 111 (e.g., with the sensor insertion axis substantially aligned with the port central axis), or be arranged in any other suitable orientation relative to the discharge port 111. The pressure sensor port 113 is preferably arranged with the sensor insertion axis perpendicular to the flow axes of the respective discharge ports 111 to which the pressure sensor port 113 is adjacent (e.g., perpendicular to the port plane), but can alternatively be oriented in any suitable angle, direction, or orientation. An example configuration of the pressure sensor port 113 in relation to one or more of the discharge ports 111 is shown in FIGS. 6A and 6B. The pressure sensor port 113 is preferably arranged proximal the second end of the discharge port 111, more preferably in a region overlapping or coinciding with the channel 114, but can alternatively be arranged along any other suitable portion of the port length. The pressure sensor port 113 preferably includes one or more molded in snaps 118, which function to retain the pressure sensors 130 in the pressure sensor ports 113. Alternatively, the snaps 118 can be separate from the pressure sensor port 113, or omitted entirely. Preferably, the snaps 118 are molded into the manifold 110, but can alternatively be defined by the manifold 110 in any suitable manner, affixed to the manifold 110 after initial fabrication of the manifold as separate components, or provided in any other suitable manner.

In one example, the pressure sensor port 113 is arranged between an adjacent first and second discharge ports 111, proximal the respective second ends. The pressure sensor port 113 overlaps a region encompassing a portion of the first discharge port 111, the second discharge port 111, and the channel 114. This configuration can enable the same manifold 110 to be reconfigurable for various desired pressure sensing configurations depending on user or system requirements, and foregoes the need for complex porting between the pressure sensor ports 113 and the pressurized region of interest. However, the pressure sensor port 113 can be arranged in any other suitable location.

The pressure sensor port 113 can additionally include internal dividers that function to guide fluid connection formation (e.g., delineate where the holes should be drilled to connect the pressure sensor port 113 to the respective lumen). The internal dividers can additionally include a groove, channel, or other seating mechanism that functions to align and/or retain the pressure sensor tip. The internal dividers are preferably recessed relative to the walls of the pressure sensor port 113, but can alternatively be coextensive with the walls, extend beyond the walls, or have any other suitable height. In one variation, the pressure sensor port 113 can include three internal dividers arranged in a plane substantially parallel the port plane, wherein the first internal divider extends parallel the wall dividing a first and second adjacent discharge port 111, the second internal divider extends parallel an interface between the channel 114 and the first discharge port 111, and the third internal divider extends parallel an interface between the channel 114 and the second discharge port 111. In a second variation, the first internal divider extends parallel the wall dividing an adjacent one of the first and second discharge ports 111, and the second and third internal dividers meet the first internal divider at a first end and are substantially evenly radially distributed relative to the first internal divider (e.g., wherein the first, second, and third internal dividers are separated by) 120°. However, the pressure sensor port 113 can include any suitable number of internal dividers arranged in any suitable configuration.

2.1.3 Channel (Galley)

The manifold 110 includes a channel 114, which may be called a galley, and which functions to contain a reservoir of compressed air that is simultaneously accessible to each of the actuators 120. The channel 114 intersects the first and second discharge ports 111 between the respective first and second ends of each of the discharge ports 111. Alternatively, the channel 114 can be connected by a secondary manifold or otherwise connected to one or more of the discharge ports 111 of the manifold 110. The channel 114 may be fluidly connected to every discharge port 111 of the manifold 110. Alternatively, the channel 114 may be connected to a first subset of the discharge ports 111 and fluidly isolated from a second subset of the discharge ports 111. The channel 114 may extend normal to (i.e. orthogonal to) the discharge ports 111. Alternatively, the channel 114 may extend parallel to or at any other suitable angle to the discharge ports 111. The channel 114 preferably lies in a same plane as the discharge ports 111. Alternatively, the channel 114 may be offset from the port plane (e.g., the channel 114 may lie above or below the port plane, extend at an angle to the port plane, etc.). The channel 114 is preferably substantially linear (e.g., define a substantially linear flow axis), but can alternatively be curved (e.g., toward or away from the second end, out from the port plane, etc.) or have any other suitable configuration. However, the channel 114 can be otherwise configured or arranged.

The channel 114 is preferably molded directly into the manifold 110, but can alternatively be drilled, milled, or otherwise manufactured into the manifold 110. The channel 114 is preferably connected to an output of a filter 160, but can alternatively be connected directly to an input. The channel 114 preferably has a substantially constant cross-section along its length, but can alternatively have a variable cross-section. The channel diameter is preferably substantially the same as (or on the order of) the port diameter, but can alternatively be larger or smaller. The channel can have a circular cross section, an oblong cross section, or have any other suitable cross-section. However, the channel can have any other suitable configuration.

Figure 10:
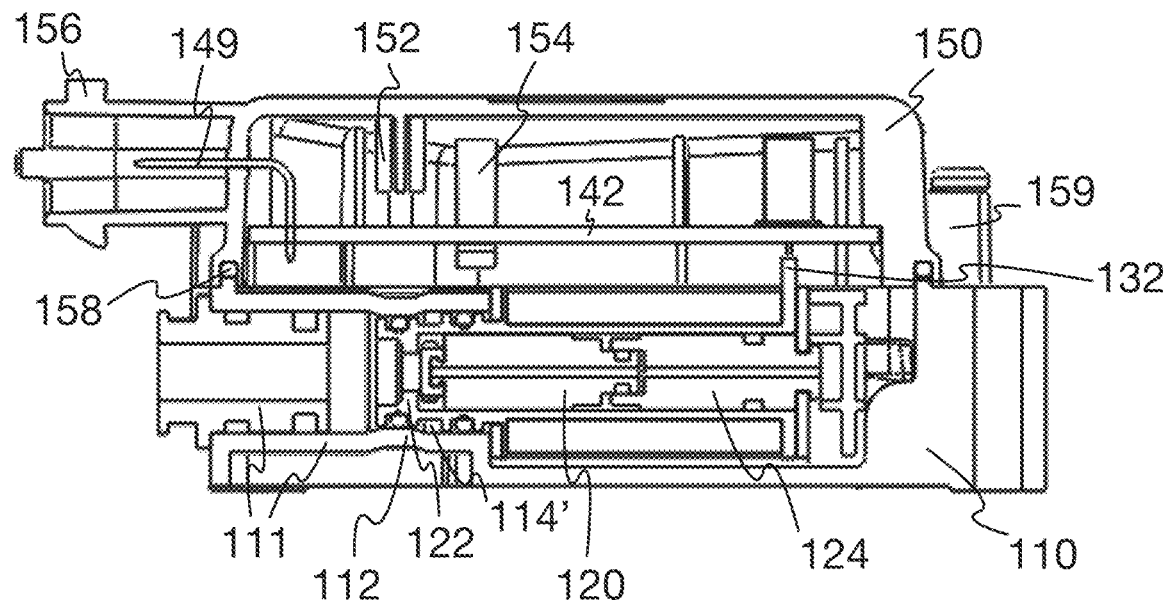
FIG. 10 depicts a cross sectional view through the cover, electronics module, and manifold of an example embodiment of the system.

The channel 114 is preferably configured such that the pressure everywhere in the channel 114 is substantially the same regardless of whether or not one or more of the actuators 120 is in a position that fluidly connects the channel 114 to one or more of the discharge ports 111. This configuration can be achieved, for example, by a pass-through region 114' (pass-over region, pass-around region, etc.) as shown in FIG. 10. The passthrough region 114' can be cooperatively defined by the channel lumen (having a substantially constant cross-section throughout its length) and a constricted portion of the actuator 120 (e.g., constricted along an axis that is orthogonal to the port plane, constricted radially, etc.), upstream from the barrel, which coincides with the channel 114 when the actuator 120 is in the closed position. Alternatively, the passthrough region can be defined as an outcropping along the length of the channel lumen. However, the passthrough region can be otherwise defined. Alternatively, sections of the channel 114 can be selectively sealed off when the actuators 120 are closed, or operate in any other suitable manner.

2.1.4 Cavity

Figure 13:
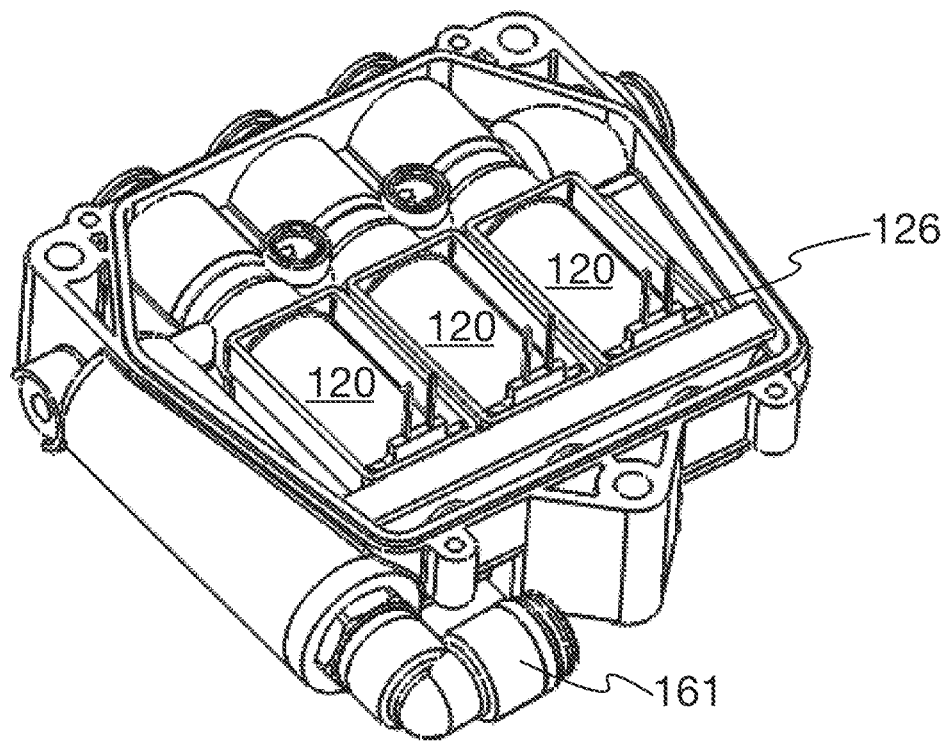
FIG. 13 depicts a perspective view of the manifold of the sixth example embodiment of the system, including actuators coupled to the second ends of the discharge ports.

The manifold 110 preferably includes a cavity 115, which functions to receive the actuator(s) 120 and to coaxially align the actuator(s) 120 with the discharge port(s) 111. In variations of the system 100 employing a potting compound to reduce vibration and enhance structural rigidity of portions of the system 100, the cavity 115 can also function to receive the potting compound. The cavity 115 preferably includes a surface that is lower than the lowermost edge of the discharge ports 111 (e.g., recessed relative to the discharge ports 111, substantially parallel the nadir of the discharge ports 111, etc.), as shown in FIG. 4, but can alternatively include a surface parallel to a chord of the port cross section (e.g., impinges on the port cross section) or arranged in any other suitable location relative to the discharge ports 111. The recessed surface can function to receive actuator(s) 120 that have a larger diameter than the respective discharge port 111. The cavity 115 can also include a number of sub-cavities, each sub-cavity configured to receive a single actuator 120 and separated from an adjacent sub-cavity by a divider protruding from the surface, as depicted by example in FIGS. 9 and 13. The cavity 115 is preferably contiguous with the discharge ports 111, but can alternatively be otherwise related to the discharge ports 111. In one example, the cavity 115 intersects the second end of the discharge ports 111.

2.1.5 Pilot Ports

Figure 17:
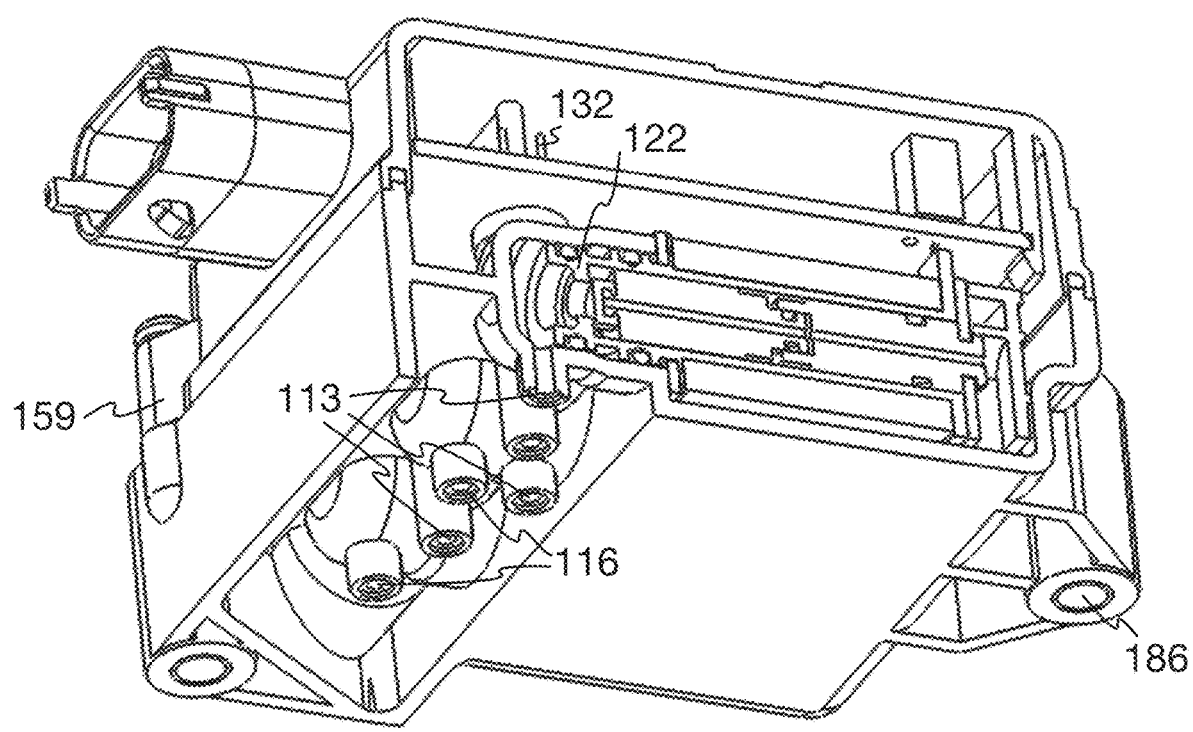
FIG. 17 depicts a perspective view of a cross section through the cover, electronics module, manifold, and actuator of an embodiment of the system configured to couple to a second stage manifold.

As shown in FIG. 17, the manifold 110 can additionally include one or more pilot ports 116, which function to fluidly connect the discharge port(s) 111 to a second stage manifold 170 and permit the actuator(s) 120 to modulate airflow through the second stage manifold 170. Preferably, the pilot port(s) 116 are arranged with a longitudinal axis (e.g., flow axis) extending out of the plane shared by the flow axes of the discharge port(s) 111 (e.g., at an oblique angle to the port plane, orthogonal to the port plane, etc.), such that the second stage manifold 170 does not extend substantially outside the broadest projected area of the manifold 110 when the second stage manifold 170 is coupled to the manifold 110. Alternatively, the pilot port(s) 116 can be arranged in any suitable orientation, and configured in any suitable manner.

2.1.6 Internal Support Features

The manifold 110 can additionally include one or more internal support features 117, which function as registration and/or alignment features for aligning and properly orienting internal components (e.g., an actuator 120). The internal support features 117 can also function as load-bearing members of the manifold 110 that dampen, absorb, and/or provide reaction forces to dynamic components (e.g., actuators 120) during operation, in order to reduce wear on the system 100. As shown in FIG. 4, an internal support feature 117 can include a ridge that cooperates with other portions of the cavity 115 in receiving the actuator(s) 120. The internal support features 117 can additionally or alternatively include any suitable features that mechanically configure portions of the system 100 within the manifold 110 and/or provide mechanical support to portions of the system 100. The manifold 110 can additionally include a valve retainer 119, which functions to retain the actuators 120 within the cavity 115 and hold them in place. The valve retainer 119 is preferably molded into the manifold 110, but can alternatively be inserted, fastened, or otherwise coupled to the manifold 110 in any suitable manner. Alternatively, the valve retainer 119 can be omitted entirely.

2.1.7 Manifold Examples

In an example embodiment, the manifold 110 defines a first and second discharge port 111, each discharge port 111 defining a flow axis extending between a first and second end of the discharge port 111. Each discharge port 111 also defines a receiving region 112 at the second end. Each of the flow axes are arranged in a common plane, with each of the flow axes parallel to one another. The manifold 110 additionally defines a channel 114, intersecting the first and second discharge port 111 between the first and second ends of each discharge port 111. The manifold 110 additionally defines a cavity 115, which intersects the second end of each discharge port 111, forming a void intended to receive an actuator 120. The manifold 110 additionally defines a pressure sensor port 113, positioned between the first and second discharge port 111, which defines a sensor insertion axis that is orthogonal to the common plane. The pressure sensor port 113 is separated from the first discharge port 111, the second discharge port 111, and the channel 114 by a thickness of the manifold 110. The thickness can be specified by the mold from which the manifold 110 is made by injection-molding. The thickness of the manifold 110 can be removed (e.g., by drilling) between the pressure sensor port 113 and any one of the first discharge port 111, the second discharge port 111, and the channel 114, in order to fluidly connect two of these regions. This fluid connection allows a pressure sensor 130, arranged in the pressure sensor port 113, to make a contact pressure measurement of the pressure in any one of the first discharge port 111, the second discharge port 111, and the channel 114.

2.2 Actuator

As shown in FIG. 1, the actuator 120 of the system 100 can include a barrel 122, a body 124, and a connector 126. The actuator 120 functions to selectively bring the channel 114 into fluid communication with the discharge port 111 to which the actuator 120 is coupled. In one variation, the actuator 120 is selectively operable between an open position, wherein the actuator 120 permits fluid connection between the respective discharge port 111 and the channel 114, and a closed mode, wherein the actuator 120 ceases (e.g., prevents) fluid flow between the respective discharge port 111 and the channel 114. Actuator operation can be actively controlled by the electronics module, passively controlled, or otherwise controlled by any other suitable control system. The actuator 120 is preferably at least partially housed by the manifold, but can alternatively be arranged external the manifold (e.g., in variants where the manifold only defines the discharge ports 111 and the pressure sensor ports 113), or be arranged in any other suitable location relative to the manifold.

The actuator 120 can define an actuation axis, wherein the actuator 120 can be arranged within the cavity 115 such that the actuation axis is parallel (more preferably collinear or coaxial, but alternatively in any suitable configuration) with the flow axis of the first discharge port 111. However, the actuator 120 can be arranged with the actuation axis at any suitable angle to the flow axis of the discharge port 111. The actuator 120 is preferably configured to regulate the flow of a pressurized fluid between the channel 114 and the first end of the first discharge port 111, but can alternatively regulate pressurized fluid flow between a first and second discharge port 111, or regulate pressurized fluid flow in any other suitable flow pattern.

Actuator 120 operation in the open position preferably permits pressurized air to pass from the channel 114 to the discharge port 111, and from that point onwards to any service attached to the discharge port 111. Actuator actuation to the open position is preferably performed under the direct influence of the electronics module 140, which itself may be autonomously, semi-autonomously, or manually controlled. The system preferably includes a plurality of actuators 120, but alternatively there can be only a single actuator 120. Each actuator 120 is preferably connected to and regulates a different discharge port 111, but multiple actuators 120 can alternatively be connected to and regulate a single discharge port 111, a single actuator 120 can be connected to and regulate multiple discharge ports 111, or the system can include any other suitable actuator 120 and discharge port 111 configuration.

Each of the actuators 120 is preferably oriented parallel to the port plane, but can alternatively be arranged at an non-zero angle to the port plane, arranged perpendicular the port plane, or otherwise arranged. Each actuator 120 is preferably coaxially aligned with a respective discharge port 111, but can alternatively be offset from the respective port or otherwise arranged.

The actuator 120 is preferably a solenoid valve, examples of which include a two-way direct acting solenoid valve, a two-way pressure-balanced solenoid valve, and a three-way solenoid valve. The solenoid valve can have one of a set of orifice sizes (e.g., a 2 mm orifice, a 4 mm orifice, and a 0.5 mm orifice) that governs the maximum flow rate through the solenoid valve between the channel 114 and the discharge port 111 during actuation, for a given pressure in the channel 114. The actuator 120 can alternatively be any suitable linear or rotary actuator that enables electromechanical control of fluid communication between the channel 114 and one or more of the discharge ports 111. The actuator 120 is preferably controlled by the electronics module 140 using a pulse-width modulated (PWM) signal, but can alternatively be controlled using an analog signal, a digital signal, an amplified analog or digital signal, or any other suitable electronic control scheme.

Figure 18:
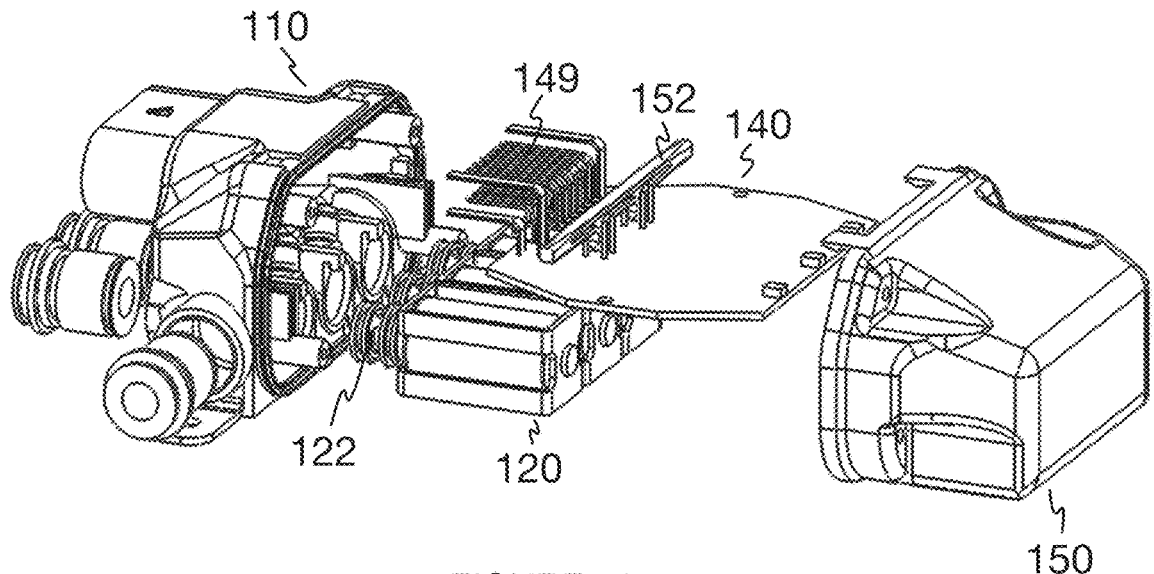
FIG. 18 depicts a partially exploded view of a seventh example embodiment of the system, including a dividing plane between the manifold and the cover that is perpendicular to the plane in which the actuators are oriented.

The barrel 122 is preferably a cylindrical portion of the housing of the actuator 120, as shown in FIG. 18. The barrel 122 functions to seal the actuator 120 against the manifold 110, preferably at the receiving region 112 but alternatively any suitable portion of the discharge port 111 or manifold 110. The barrel 122 can include a void as shown in FIG. 18, which permits the channel 114 to fluidly couple to the discharge port 111 when the actuator 120 is in the open position. The barrel 122 can additionally include a constriction, as shown in FIG. 18, which permits the channel 114 to remain fluidly contiguous independently of the actuation of the actuator(s) 120. The barrel 122 is preferably sealed against the manifold 110 using one or more elastomeric ring-type seals emplaced in circumferential external grooves in the surface of the barrel 122, as shown in FIG. 18. Alternatively, the barrel 122 can be sealed using a press-fit, a weld, an airtight epoxy, a gasket, or using any other suitable seal.

The body 124 is preferably the bulk of the housing of the actuator 120, excepting the barrel 122, and functions to contain the other portions of the actuator 120 (e.g., a solenoid, a solenoid core, mechanical supports, etc.). The body 124 can be of an open-frame configuration that is unpressurized (e.g., at atmospheric pressure), due to the seal of the barrel 122 against the manifold 110. The body 124 of each actuator 120 is preferably housed in the cavity 115 of the manifold 110, and can be retained in the cavity 115 by one or more internal support features 117 of the manifold 110. Alternatively, the body 124 can be retained in a sub-cavity of the cavity 115, each sub-cavity configured to firmly couple to and retain the body 124 of a single actuator 120. Alternatively, the body 124 can be mounted to the manifold (e.g., by screws, straps, adhesive, etc.). However, the body can be otherwise coupled to the manifold. The body is preferably coaxially arranged with and actuatably coupled to the barrel, but can alternatively be offset from the barrel, decoupled from the barrel, or otherwise arranged relative to the barrel.

The connector 126 preferably electrically couples the actuator 120 to the electronics module 140, and functions to provide controllable power to the actuator 120 and to decouple mechanical and/or thermal loads of the actuator 120 from the electronics module 140. Each actuator 120 preferably includes a single connector, but can alternatively include multiple connectors. Connectors are preferably not shared between actuators, but can alternatively be shared between actuators (e.g., wherein the connectors are connected to a common rail, wherein the actuators are connected to the common rail). When the actuator is assembled to the manifold, the connectors preferably extend orthogonal to the port plane, away from the cavity surface. Alternatively, the connectors can extend parallel to the port plane, at a non-zero angle to the port plane, or extend in any other suitable direction. In example variations, the connector 126 can be an articulated linkage, a wire, a soldered connector, a spring-loaded connector, a flying lead with an associated plug, or any suitable connection that electrically couples the actuator 120 to the electronics module 140 while maintaining mechanical and thermal isolation between the actuator 120 and the electronics module 140. However, the connector 126 can be a pin, soldered junction, male/female connector, or be any other suitable connector.

One or more variations of the actuator(s) 120 can also omit one or more of the above elements, as well as provide a plurality of one or more of the above elements, in providing a suitable actuator 120.

In an example embodiment, the system 100 includes a first and second actuator, wherein the first and second actuators are a first and second solenoid valve, respectively. Each solenoid valve is arranged within the cavity 115 and coaxially arranged with the first and second discharge ports 111, respectively. Each solenoid valve includes a set of connectors 126. The connectors 126 of each solenoid valve extends perpendicularly away from the common plane of the flow axes of the discharge ports 111 of the manifold 110, and towards the electronics module 140. Each solenoid valve 120 preferably includes a valve barrel that is configured to seal against the receiving region of the corresponding discharge port 111.

2.3 Pressure Sensor

Figure 14:
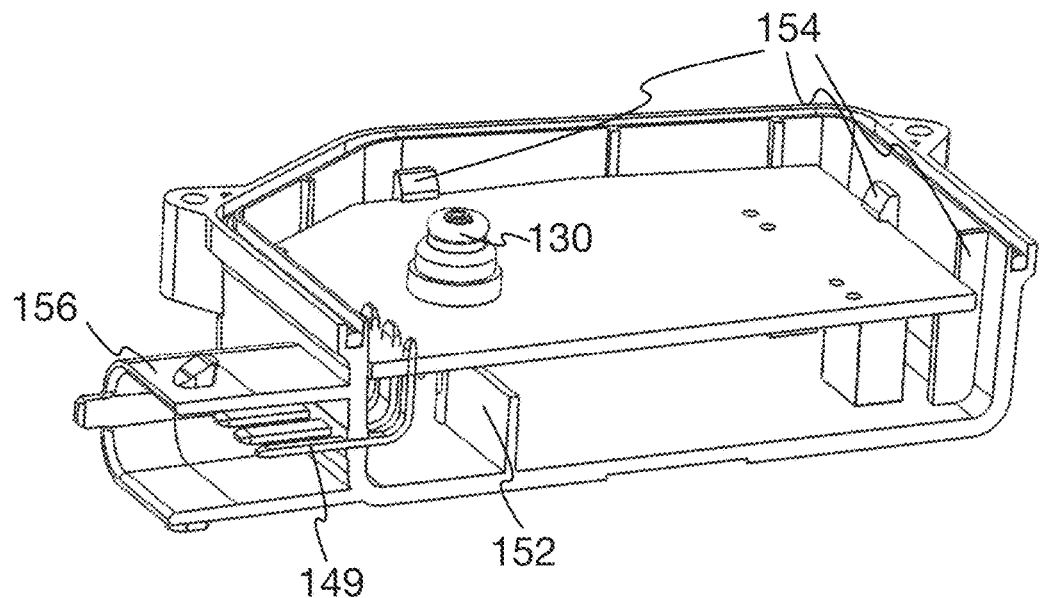
FIG. 14 depicts a perspective view of a cross section of the cover of an embodiment of the system, including a PCB assembly and a pressure sensor an assembled embodiment of the system.

As shown in FIGS. 1 and 14, the system 100 includes a pressure sensor 130. The pressure sensor 130 functions to measure a signal indicative of the air pressure in one of several portions of the manifold 110 (e.g., in the pressure sensor port 113, the channel 114, the discharge port 111, etc). The pressure sensor 130 can also function to enable control of the actuator(s) 120 based on pressures detected by the pressure sensor 130. The pressure sensor 130 is preferably arranged in a pressure sensor port 113, wherein the pressure sensor port 113 has preferably been "activated" (i.e., a fluid connection has been installed between one or more of the discharge ports 111, the channel 114, and the pressure sensor port 113) prior to assembly of the pressure sensor 130 in the pressure sensor port 113. One or more variations of the pressure sensor(s) 130 can also omit one or more of the above elements, as well as provide a plurality of one or more of the above elements, in providing a suitable pressure sensor 130.

The pressure sensor 130 is preferably a single point pressure transducer that outputs an electrical signal proportional to the pressure of a region of physical space that is fluidly connected to the pressure sensor 130. However, the pressure sensor 130 can be any other suitable pressure sensor. Examples of the types of pressure that can be measured include: absolute pressure, gauge pressure, vacuum pressure, and differential pressure. Alternatively, the pressure sensor 130 can measure any suitable type of pressure. The pressure sensor 130 can sense the pressure by sensing one or more of: piezoresistive strain, the piezoelectric effect, a capacitive change, an inductance change, the Hall effect, eddy currents, electromagnetic disturbances, an optical path length change, a resistance change, a change in displacement, a change in resonant frequency, an ionization fraction, and a change in thermal conductivity. Alternatively, the pressure sensor 130 can sense the pressure by sensing any other suitable parameter of the fluid or of a container of the fluid. In an example embodiment, the pressure sensor 130 has a protrusion along the insertion axis of the pressure sensor 130 into the pressure sensor port 113, and additionally includes a radial seal between the protrusion and the pressure sensor port 113. In alternative variations, the pressure sensor 130 can seal against the pressure sensor port 113 in any suitable manner.

Figure 15:
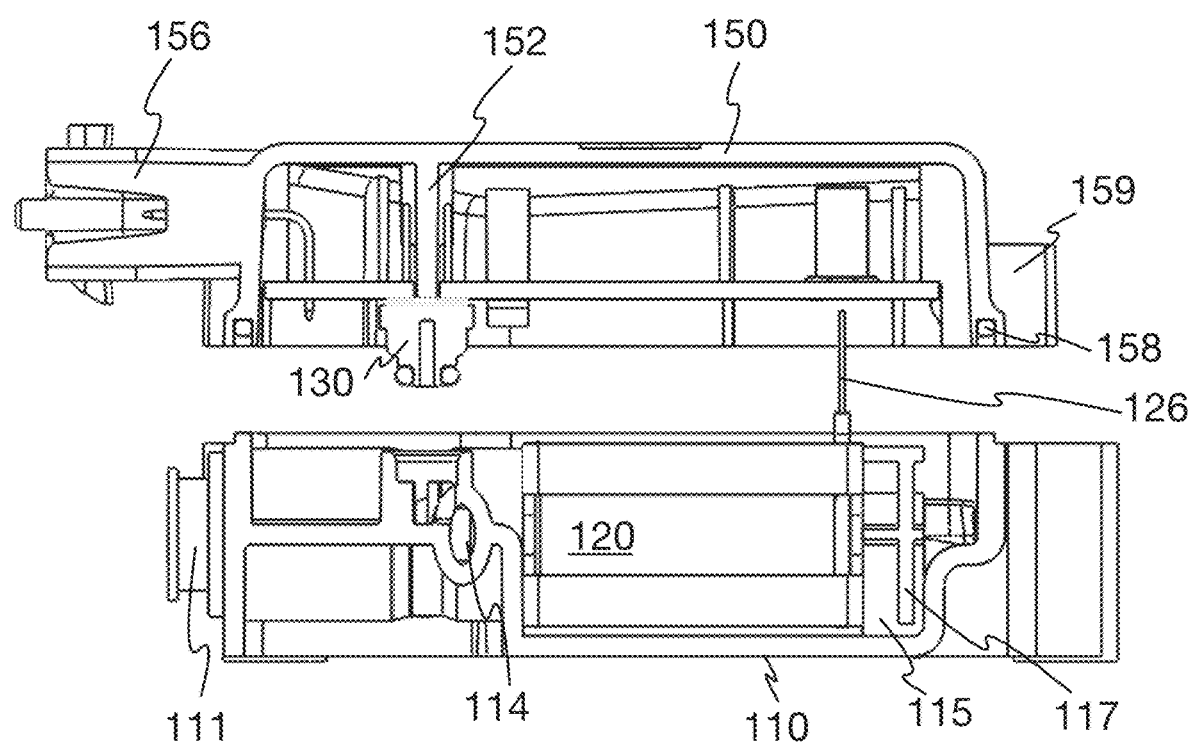
FIG. 15 depicts a partially exploded cross sectional view through the cover, electronics module, and manifold of an embodiment of the system, including a pressure sensor and an actuator.

The pressure sensor 130 can additionally include a connector 132. The connector 132 functions to electrically couple the pressure sensor 132 to the electronics module 140, providing a conduit for power and/or data transfer. The connector 132 is preferably an electrical connector, but can alternatively be any other suitable connector. The connector 132 preferably includes a set of electrical leads, but can alternatively include a set of conductive linkages or have any other suitable configuration. The connector 132 can be rigid or flexible. The connector 132 may extend orthogonal to the port plane, away from the pressure sensor 130 and/or manifold, but can additionally or alternatively extend towards the electronics module 140, as shown in FIG. 15, extend parallel to the connector 126 of the actuator 120, or be arranged in any suitable manner. In an example embodiment, the connector 132 is a set of electrical leads, rigidly connected to the pressure sensor 130, each of the set of electrical leads extending perpendicularly away from the shared plane of the flow axes of the discharge ports 111 and towards the electronics module 140.

2.4 Electronics Module

The electronics module 140 of the system 100 functions as an electronic command and control interface between the actuator(s) 120, the pressure sensor(s) 130, and other input or output electronic signals. The electronics module 140 can additionally cooperatively enclose the actuator(s) 120 and the pressure sensor(s) 130 within the manifold 110. The electronics module can additionally function to control power provision to the connected components. As shown in FIG. 1, the electronics module 140 can include an electronics substrate 142, a displacement sensor 144, an input/output module 146, a processor 148, and an external connector 149.

The electronics module 140 is preferably electrically connected to and controls the operation of the connector(s) 132 of the pressure sensor(s) 130 and the connector(s) 126 of the actuator(s) 120. Alternatively, another control module can control one or all of the pressure sensors and actuators. The electronics module 140 is preferably a printed circuit board assembly (PCB), with the abovementioned elements wholly or partially mechanically supported and electrically connected to the PCB, but can alternatively be configured as a wire wrap circuit, a point-to-point soldered electrical circuit, or any other suitable configuration. One or more variations of the electronics module 140 can also omit one or more of the above elements, as well as provide a plurality of one or more of the above elements, in providing a suitable electronics module 140.

The electronics substrate 142 functions as a physical attachment point for portions of the actuator(s) 120, the pressure sensor(s) 130, and other elements of the system 100 requiring an electronic interface. The footprint of the electronics substrate 142 preferably substantially matches that of the manifold, but can alternatively be smaller (e.g., extend over the pressure sensor ports 113 and the actuator connector locations, etc.), or larger. The electronics substrate 142 is preferably mounted to the manifold 110 distal the cavity surface, but can alternatively be mounted along any other suitable portion of the manifold 110 or system 100. The electronics substrate 142 is preferably mounted to the manifold parallel the port plane, such that the connector(s) 132 and the connector(s) 126 substantially perpendicularly connect to the electronics substrate 142, but can alternatively mount to the manifold in any other suitable orientation. However, the electronics substrate 142 can be mounted to the manifold 110 in any other suitable configuration. The electronics substrate 142 can be mounted to the manifold 110 using a set of screws, clips, adhesive, or any other suitable mounting mechanism. The electronics substrate 142 is preferably made of a phenolic resin or other non-conductive material, and preferably includes one or more embedded copper layers, in forming a portion of a printed circuit board. Alternatively, the electronics substrate 142 can be composed of any suitable material that provides mechanical support to elements of the electronics module 140.

Figure 7:
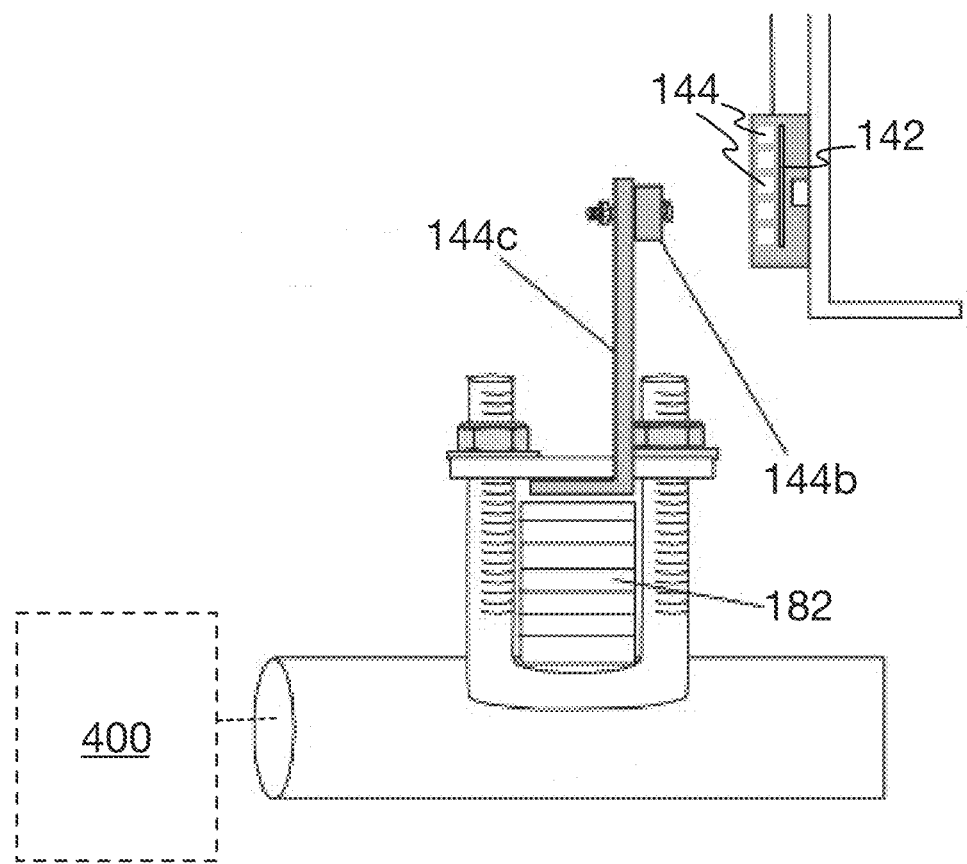
FIG. 7 depicts a specific example of an embodiment of the system including a strut and a magnet.

The displacement sensor 144 of the electronics module functions to detect and report a displacement measurement. A displacement measurement preferably includes a measurement of the relative distance or movement between the system 100 and a portion of a vehicle, but can additionally or alternatively include an absolute distance measurement, a motion measurement, or any other suitable measurement. For example, the displacement sensor 144 can detect the relative movement of the system 100 with respect to a strut of a vehicle suspension (e.g., system 100 rise relative to the strut), and transmit a quantitative representation of the raising of the system 100 to other portions of the electronics module 140 or coupled electronic systems. The displacement sensor 144 is preferably an array of Hall-effect sensors that is configured to sense the relative displacement of a magnet 144b, coupled to the chassis of a vehicle 400 using a bracket 144c as depicted in FIG. 7. The displacement sensor 144 can alternatively be any form of non-contact displacement sensor. As a further alternative, the displacement sensor 144 can be any suitable sensor capable of detecting the movement and/or displacement of the system 100. The displacement sensor 144 is preferably arranged along a broad face of the electronics substrate 142 opposing (e.g., distal) the manifolds and/or actuators, but can alternatively be arranged along the broad face proximal the manifolds and/or actuators, be arranged on the manifold, or be arranged in any other suitable location. The electronics module 140 can include one displacement sensor 144 per strut; one displacement sensor 144 per manifold; one displacement sensor 144 per actuator; multiple displacement sensors 144 per strut, manifold, or actuator; one displacement sensor 144 for multiple struts, manifolds, or actuators; or include any suitable number of displacement sensor 144 configured to couple to and/or monitor any other suitable system component. However, the electronics module 140 can include and/or be connected to any other suitable set of sensors.

The input/output (I/O) module 146 of the electronics module 140 functions to route (transmit, receive, transfer) any electronic signals received or generated by the electronics module 140 to other portions of the electronics module 140 or to electrically connected external systems. The I/O module 146 can include a communicator (e.g., a wired or wireless transceiver) and a connector (e.g., on-board data connection, on-board power connection, off-board data connection, off-board power connection, etc.), but can alternatively or additionally include any other suitable set of components. The I/O module 146 can also interface with buttons, switches, lights, speakers, microphones, levers, or any other suitable input and output mechanisms in providing a communication interface between the electronics module 140 and other portions of the system 100 and/or connected external systems.

The processor 148 of the electronics module 140 functions to provide computing resources to the electronics module 140, and can also function to entirely or partially control portions of the system 100 (e.g., the actuator(s) 120). The processor 148 preferably executes command and control instructions received from an externally connected system, but can additionally or alternatively execute such instructions generated internally and cooperatively by elements of the system 100, or in combination with an externally connected system. The processor 148 can be a CPU, GPU, microprocessor, or any other suitable processor. The system can include one or more processors 148.

The external connector 149 of the electronics module 140 functions as a physical electronic interface between an externally connected system (e.g., the vehicle) and the electronics module 140. As shown in FIG. 10, examples of an external connector 149 can include specific male and/or female electrical pin arrangements, as well as a housing to facilitate proper coupling of the external connector 149 with mating components. One or more pins of the external connector 149 are preferably electrically coupled to the electronics substrate 142, in order to facilitate transfer of electrical signals between the external connector 149 and other portions of the electronics module 140. At least certain segments of the pins of the external connector 149 preferably extend in a parallel direction to the connector(s) 126 and the connector(s) 132, such that the pins, connector(s) 126, and connector(s) 132 all intersect the plane of the electronics substrate 142 while extended along the same direction. Alternatively, the pins of the external connector 149 can be connected to flexible wires, or rigidly extend in any suitable direction. The external connector 149 can extend outside of the housing (cooperatively formed by the manifold and cover), terminate flush with the exterior surface of the housing, extend beyond the housing, or extend to any other suitable endpoint.

In an example embodiment, the electronics module 140 is arranged parallel to the common plane of the flow axes of the discharge ports 111 of the manifold 110. The electronics module 140 and the manifold 110 cooperatively enclose the first solenoid valve 120a, the second solenoid valve 120a, and the pressure sensor 130. The electronics module 140 is configured to receive and electrically couple to the electrical leads of the pressure sensor 130, the connector 126 of the first solenoid valve 120a, and the connector 126 of the second solenoid valve 120a. The electrical leads and connectors are preferably soldered to the electronics substrate 142 of the electronics module 140, but can alternatively be otherwise electrically and/or physically connected to the electronics substrate 142.

2.5 Cover

As shown in FIG. 10, the cover 150 can include a pressure sensor support 152, an electronics retainer 154, a connector housing 156, a seal 158, and a manifold retainer 159. The cover 150 functions to cooperatively define a housing with the manifold 110, wherein the housing encloses the actuator(s) 120, the pressure sensor(s) 130, and the electronics module 140. The cover 150 can also function to form a fluid impermeable seal against the manifold 110, such that the system 100 (e.g., housing) can maintain a positive internal pressure. Alternatively, the housing can be substantially fluid permeable. In some variations, the lumen defined between the cover 150 and the manifold 110 can be wholly or partially filled with a potting compound.

The cover can define a broad face, longitudinal axis, thickness (e.g., perpendicular the broad face), or any other suitable dimension or component. In one variation, the cover is configured to mount to the manifold with the cover broad face substantially parallel a manifold broad face. In a second variation, the cover is configured to mount to the manifold with the cover broad face perpendicular a manifold broad face (e.g., with the cover broad face perpendicular the manifold longitudinal axis). However, the cover can couple to the manifold in any other suitable manner.

Figure 21:
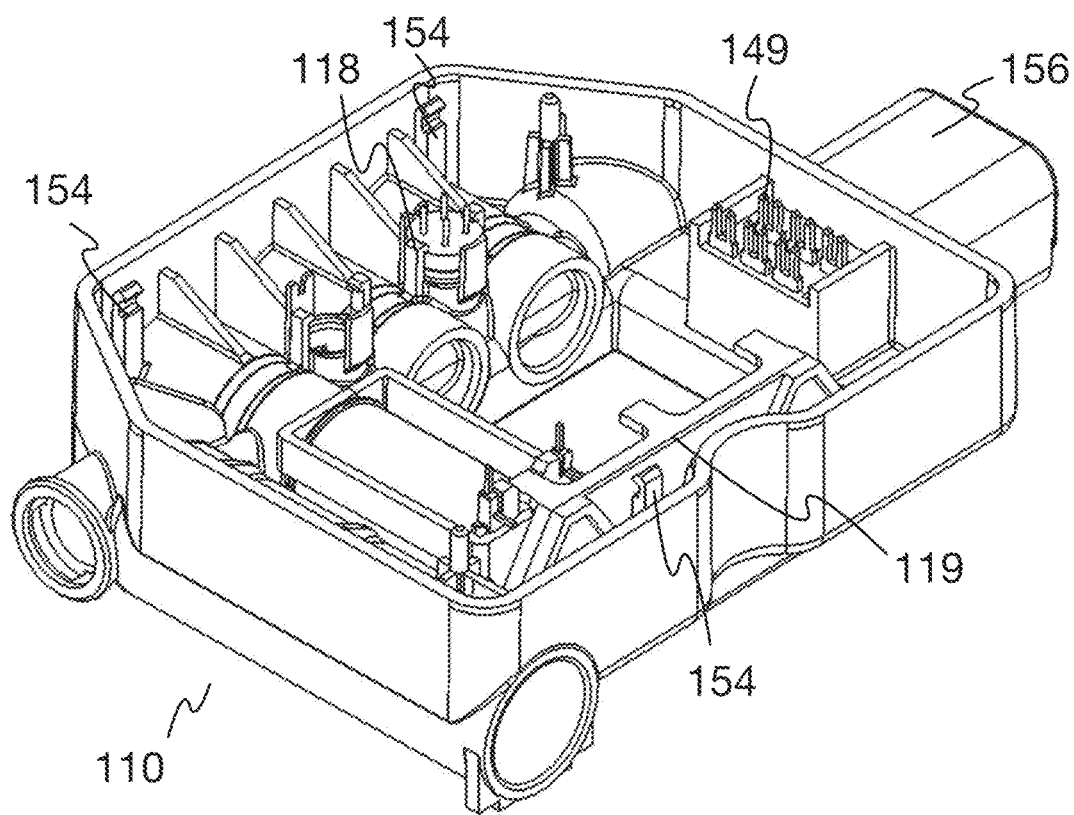
FIG. 21 depicts a perspective view of the manifold of an eighth embodiment of the system, including pressure sensor supports integrated with the pressure sensor ports.

The pressure sensor support 152 of the cover 150 functions to counteract pressure force exerted on the pressure sensor 130. The pressure sensor support 152 preferably prevents the electronics module 140 from experiencing stress and/or strain that can result from a pressure force exerted on the pressure sensor 130. The pressure sensor support 152 is preferably a scaffold, extending at least partially from the internal surface of the cover 150, and includes at least one post substantially aligned with and extending towards a corresponding pressure sensor 130, pressure sensor mounting point on the electronics substrate 142, and/or pressure sensor port 113. However, the posts can be otherwise arranged. The cover preferably includes one post for each pressure sensor port 113, but can alternatively include any suitable number of posts. The cover can alternatively include any other suitable mechanical mechanism in lieu of a post for applying a reaction force to the pressure sensor 130 (e.g., a spring). The pressure sensor support 152 can alternatively be integrated with the pressure sensor port 113 of the manifold 110, e.g., as a set of snaps, as shown in FIG. 21. The post preferably abuts a surface of the pressure sensor 130, more preferably an end of the pressure sensor distal the manifold, but can alternatively be separated from the pressure sensor 130, or be otherwise arranged relative to the pressure sensor. In the variation in which the post abuts the pressure sensor, the post can provide a force path between the pressure sensor 130 and the cover 150, thereby circumventing the electronics module 140 (e.g., prevent the pressure sensor 130 movement from substantially deforming the electronics module 140). Alternatively, any other suitable structure of the cover 150 can provide the described force path, in routing the pressure force away from the electronics module 140 and electronics substrate 142. The post end proximal (e.g., abutting) the pressure sensor 130 preferably has a larger surface area than the pressure sensor end, but can alternatively have a smaller surface area or any other suitable surface area. The post end proximal the pressure sensor can be bare, include a set of dampening mechanisms (e.g., springs, foam, etc.), or include any other suitable component.

The electronics retainer 154 of the cover 150 preferably functions to securely hold the electronics substrate 142 in position (e.g., retain the electronics substrate), as shown by example in FIG. 14. The electronics retainer 154 is preferably one or more snaps, into which the electronics substrate 142 can be pressed, slid, clipped, or otherwise removably fastened. The electronics retainer 154 can alternatively be any other form of removable or permanent fastening subsystem or component that suitably retains the electronics substrate 142 and/or the electronics module 140 in the void between the cover 150 and the manifold 110. In another specific example, the electronics retainer 154 is integrated with (e.g., molded into, defined by, fastened to) the manifold 110, and is not part of the cover 150. In a variation of this specific example, the electronics substrate 142 is snapped into the manifold 110 and does not interface with the cover 150. Alternatively, the system 100 omits the electronics retainer 154.

The connector housing 156 of the cover 150 functions to protect the electrical interface of the external connector 149, as well as to facilitate manual coupling and decoupling of external systems to the external connector 149. The connector housing 156 is preferably a boss extending from the cover 150 around the external connector 149, and can include one or more grooves, snaps, ridges, and similar features to facilitate coupling as described. The connector housing 156 can extend perpendicular the cover broad face, parallel the cover broad face, or in any other suitable direction at any suitable angle. An example connector housing 156 is depicted in FIG. 14. In a specific example, the connector housing 156 is molded into the manifold 110 instead of the cover 150. In another specific example, portions of the connector housing 156 are defined by the cover 150, and separate portions of the connector housing 156 are defined by the manifold 110, the two portions cooperatively defining the connector housing 156.

The seal 158 of the cover 150 functions to prevent uncontrolled fluid communication between the exterior and interior of the housing. The seal 158 preferably facilitates the internal pressurization of the coupled cover 150 and manifold 110, though the coupled cover 150 and manifold 110 may not be entirely or partially pressurized during normal operation. The seal 158 preferably extends along the entirety of the junction between the manifold and the cover, but can alternatively extend along a portion of the junction or be arranged in any other suitable location. In variations in which the void between the cover 150 and manifold 110 is filled or partially filled with a potting compound, the seal 158 can function to retain the potting compound within the void. The seal 158 is preferably an elastomeric ring, emplaced along a raised boss of either the manifold 110 or cover 150, as illustrated by example in FIG. 10. Alternatively, the seal 158 can be a weld joint, an epoxy layer, a gasket, or any other suitable seal between the cover 150 and the manifold 110. The seal 158 can additionally or alternatively include a plurality of seals 158 or sealed regions, located at any portion of the manifold 110 or cover 150 that includes a hole, leak path, opening, joint, or any other region or orifice through which fluid can pass.

The manifold retainer 159 of the cover 150 functions to retain the cover 150 against the manifold 110. In some variations, the manifold retainer 159 is one or more snaps that allow the cover 150 to be clipped (snapped, press-fit) to the manifold 110. In other variations, the manifold retainer 159 can be a set of bolts, screws, nuts, and/or holes that cooperatively fasten the manifold 110 to the cover 150. In still further variations, the manifold retainer 159 is a weld joint between the cover 150 and the manifold 110. The manifold retainer 159 can additionally or alternatively include a combination of removable and permanent coupling mechanisms and/or fasteners, or any other suitable device for retaining the cover 150 against the manifold 110. In a specific example, the cover 150 is welded to the manifold 110, preferably by plastic welding (e.g., ultrasonic welding, hot plate welding, linear vibration welding, etc.), but alternatively by any suitable form of welding or means of affixing the cover 150 to the manifold 110.

2.6 Filter

Figure 8:
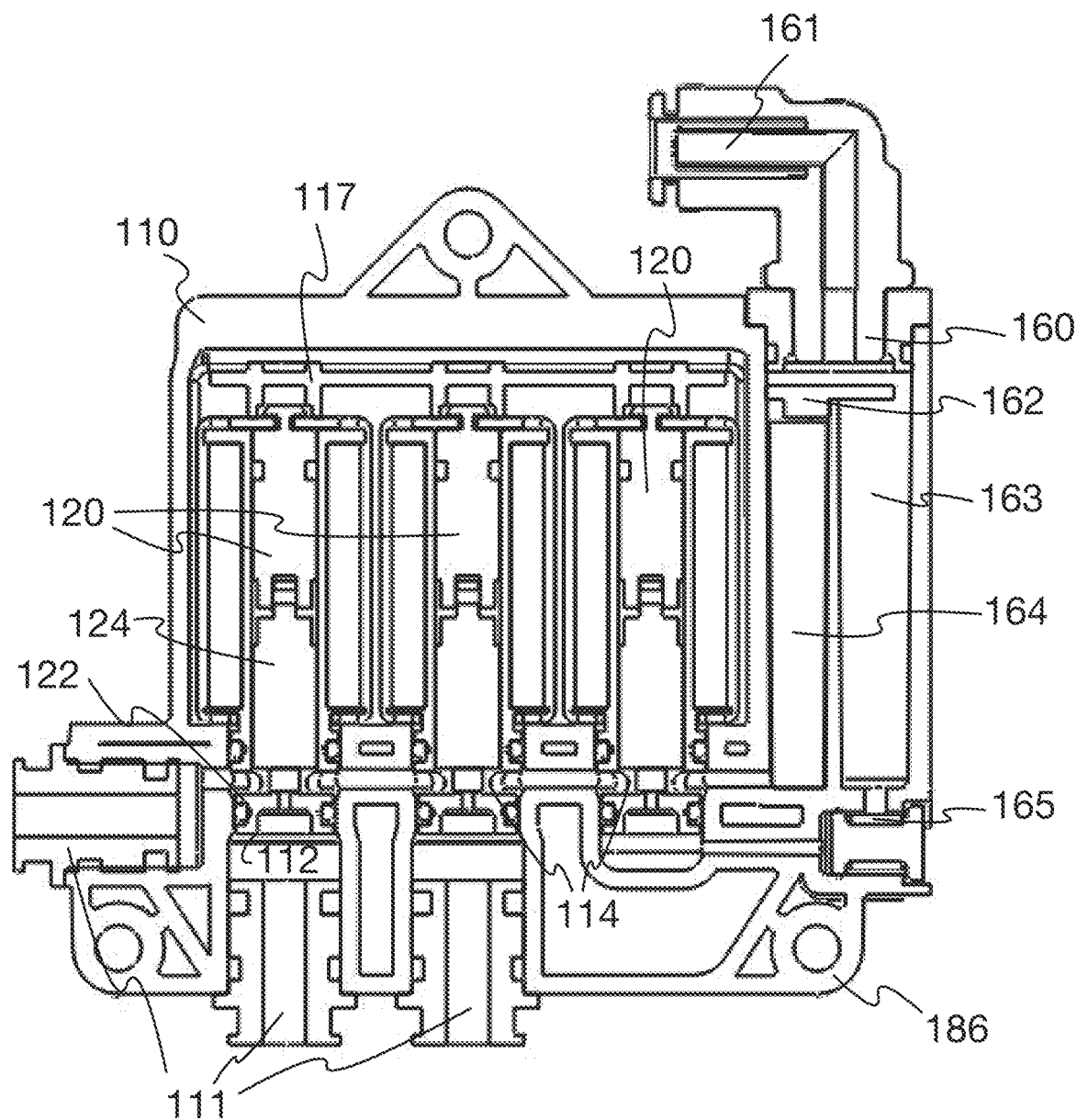
FIG. 8 depicts a cross-sectional view through the manifold of a fifth embodiment of the system, including actuators and a filter.
Figure 12:
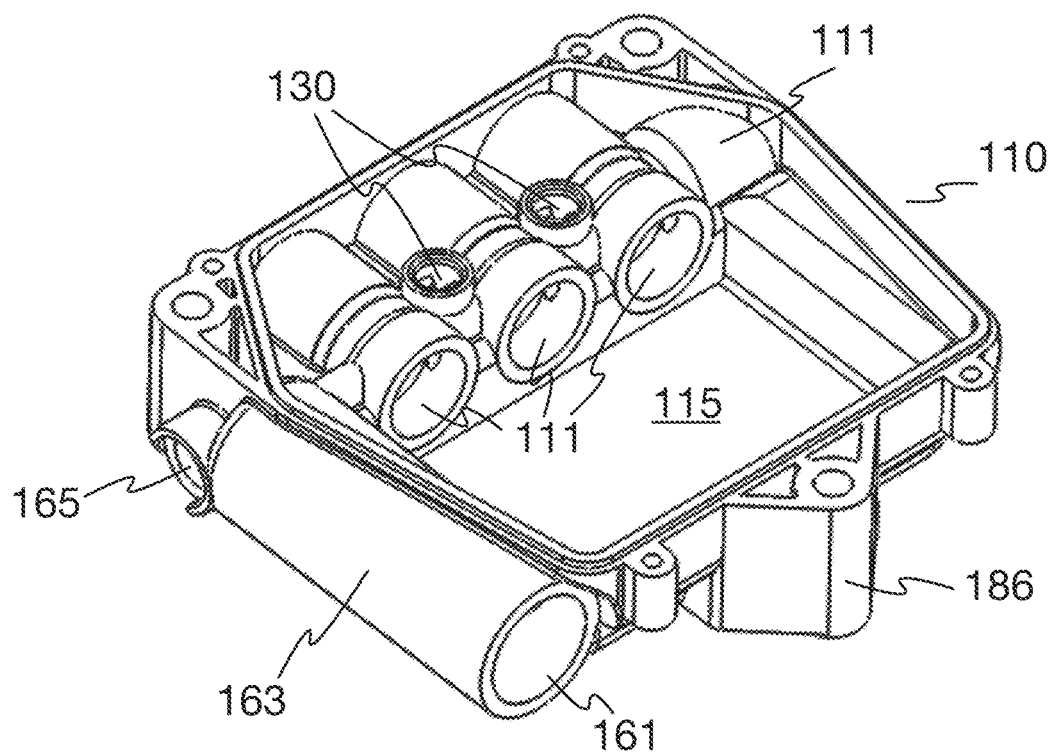
FIG. 12 depicts a perspective view of a variation of the manifold of a sixth example embodiment of the system.

The system 100 can optionally include a filter 160, which can include an input 161, a filter plate 162, an expansion chamber 163, a filter element 164, and a drain port 165. The filter 160 functions to process potentially moist, dirty air from a compressor and provide clean, dry air to the manifold 110. The filter 160 preferably defines an inlet, such as input 161, and an outlet. The inlet is preferably connected to the ambient environment, but can alternatively be connected to a pump, a fluid source, or any other fluid source. The filter outlet is preferably fluidly connected to the manifold 110, more preferably the channel 114, but can alternatively be fluidly connected to the manifold ports, the actuator, the housing interior, or to any other suitable endpoint. In some variations, portions of the filter 160 are defined by the manifold 110, as depicted in FIG. 5. The filter 160 is preferably an integrated, coalescing, self-purging filter. A coalescing filter can be a filter that includes a region of porous, absorbent material that creates a tortuous path for air flowing through the region. This tortuous path through the material preferably causes moisture to be absorbed into the material, and wicked towards the edge(s) of the region to be excreted from the region and subsequently expelled from the filter. Alternatively, a coalescing filter can be any other suitable filter that coalesces fluid (e.g., liquids), particulates, or other components from the fluid flowing therethrough. An integrated filter can be a filter that is at least partially integrated with the manifold 110. However, the filter 160 can be any other suitable filter type. The filter 160 can also include a housing, and the housing is preferably at least partially defined by the manifold 110 (e.g., the manifold 110 includes a chamber that forms the expansion chamber 163 of the filter 160). A self-purging filter can be a filter that exhausts the condensed moisture and/or removed particulates as a result of the airflow through the filter during normal operation (e.g., periodically, constantly, when a pressure condition is met, etc.). The filter 160 is preferably positioned adjacent to the cavity 115 of the manifold 110, in order to provide a compact package size of the system 100, as depicted in FIGS. 8 and 12. Alternatively, the filter 160 can be an inline filter that is indirectly coupled to the manifold 110 by way of a compressed air line, or positioned in any suitable location relative to the manifold 110 (e.g., separated by a distance, in a central portion of the manifold 110, etc.). Alternatively, the filter 160 can be arranged in any other suitable configuration.

The input 161 of the filter 160 functions to couple a fluid source, more preferably a source of compressed air but alternatively another fluid source, to the system 100, and to provide the compressed air to other portions of the system 100 after passing through the filter 160. The input 161 can include a fitting, configured to couple to a standardized air hose, air compressor, or similar. The input 161 can also be separate from the filter 160, and can additionally or alternatively be included in variations that do not have an integrated filter 160, as an input point to the channel 114. In variations including a filter 160 without an expansion chamber 163 or without a filter 160, the input 161 is preferably oriented perpendicularly to the discharge ports 111, as shown in FIG. 8. Alternatively, the input 161 can be oriented in any suitable direction that permits coupling to the channel 114.

The filter plate 162 of the filter 160 functions to process particulates in the compressed air entering the filter 160. Processing of the particulates can include capturing, deflecting, absorbing, collecting, neutralizing, or any other suitable form of processing. The filter plate 162 may be oriented orthogonal to the inflow direction to maximize the flux of entrained particulates at the surface of the filter plate 162, but can alternatively be oriented in any suitable manner along or adjacent to the flow path through the filter 160. Particulates that can be processed (removed, neutralized) include water droplets, dust, sand, metallic pieces, or any other particles entrained in the airflow.

The expansion chamber 163 of the filter 160 functions to condense moisture that may be present in the inflowing compressed air. The moisture is preferably condensed by altering the thermodynamic state (e.g., the specific volume by way of expanding) of the inflowing air such that any entrained water vapor changes phase into droplets of liquid water, which can then collect in a portion of the expansion chamber 163 for subsequent removal via the drain port 165. This process separates condensed moisture from the resulting dry air. However, the moisture can be condensed in any other suitable manner. The expansion chamber 163 is preferably an elongated void within the filter 160, and preferably has a large volume relative to the volume of the inlet region of the filter 160 in order to facilitate expansion. Alternatively, the expansion chamber 163 can be any suitable shape and/or size.

The filter element 164 of the filter 160 functions to process impurities that may remain in the inflowing air after passing through other portions of the filter 160. Processing of the impurities can include all the forms of processing described above with respect to the filter plate 162, as well as any other suitable forms of processing. The filter element 164 is preferably disposed between the manifold 110 and the filter 160, such that fluid passing from the latter into the former must pass through the filter element 164, but can alternatively be configured in any suitable manner. The filter element 164 is preferably a coalescing filter, and preferably includes a region of fibrous and porous material through which the air is directed to pass as it flows through the filter 160. Alternatively, the filter element 164 can be an activated carbon filter, a mesh screen, or any other suitable filtering element.

The drain port 165 of the filter 160 functions to expel substances that have been filtered out of the inflowing compressed air from the system 100. The drain port 165 may include a poppet-regulated self-actuating valve, and may automatically expel the filtered substances during operation of the system 100. This can occur, for example, upon actuation of one or more of the actuator(s) 120, creating a pressure difference within the system 100 that moves a poppet valve of the drain port 165.

2.7 Second Stage Manifold

Figure 11:
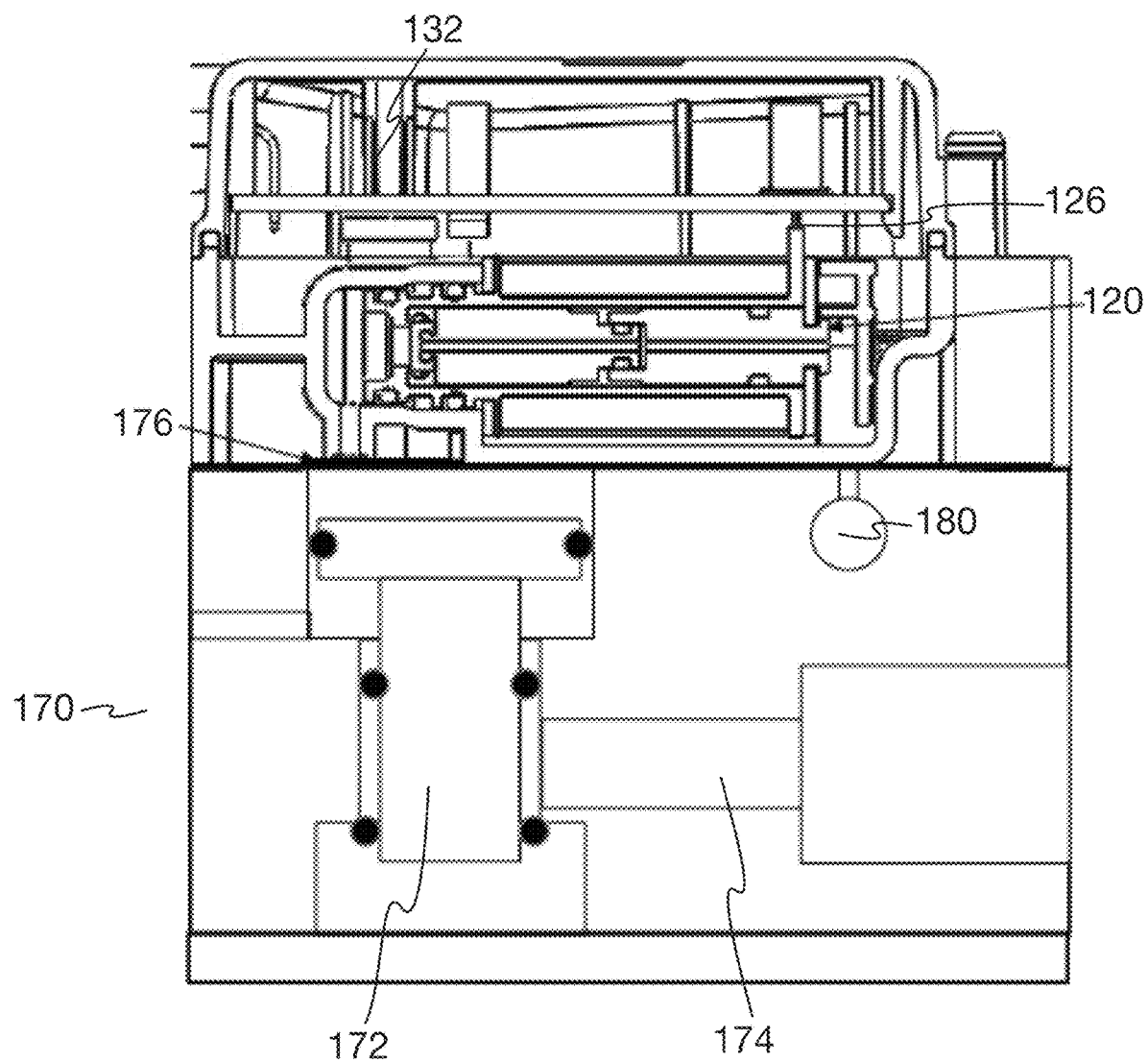
FIG. 11 depicts a cross sectional view through the cover, electronics module, manifold, and second stage manifold of an example embodiment of the system.

The system 100 can optionally include a second stage manifold 170, which can include a movable obstruction 172, a tube 174, and a gasket 176. The second stage manifold 170 functions to provide an alternative flow system that is controllable based upon the airflow through the manifold 110. In some variations, the second stage manifold 170 can function as a high-flow-rate manifold that is controlled by a low-flow-rate manifold 110. The second stage manifold 170 is preferably removable and serviceable in the field (e.g., by a user of the system 100 or driver of a vehicle 400 to which the system 100 is coupled), but can alternatively be substantially permanent. As shown in FIG. 11, the second stage manifold 170 is preferably coupled to the manifold 110 such that the second stage manifold 170 and the manifold 110 are stacked (e.g., vertically, along the flow direction, etc.), and the flow direction of air from the manifold 110 to the second stage manifold 170 is perpendicular to the flow direction along the discharge ports 111 of the manifold 110. However, the second stage manifold 170 can be oriented relative to the manifold 110 in any other suitable configuration. The system can include one or more second stage manifolds, arranged in any suitable configuration.

The movable obstruction 172 of the second stage manifold 170 functions to regulate a flow of air at a higher flow rate than is typically desired from the actuator(s) 120, but can alternatively regulate a lower or higher fluid flow rate. The movable obstruction can be an air-piloted valve, or be any other suitable valve. The air-piloted valve is preferably a poppet valve, as illustrated in FIG. 11, and is preferably actuated by applying a differential pressure and/or air flow to the poppet (e.g., it is air-piloted), using, for example, the actuator(s) 120. However, the movable obstruction 172 can be actively controlled or otherwise controlled. The movable obstruction 172 within the tube 174 is operable between an open state and a closed state, based on a controlled fluid flow directed by the actuator 120.

The tube 174 of the second stage manifold 170 functions to direct air flow from a compressed air source to an output of the second stage manifold 170, mediated by the movable obstruction 172. As shown in FIG. 11, the movable obstruction 172 is preferably actuatably housed by a portion of the tube 174 and can function to alternately block and/or permit airflow through, past, around, or otherwise traversing the movable obstruction 172. However, the movable obstruction 172 can be connected to the tube 174 in any other suitable manner, or the movable obstruction 172 can be unconnected from the tube 174. The tube 174 is preferably fluidly connected to a pilot port 116 of the manifold 110, but can alternatively be connected to any other suitable portion of the manifold 110 or system 100.

The gasket 176 of the second stage manifold 170 functions to seal the manifold 110 against the second stage manifold 170. In particular, the gasket 176 can function to seal the pilot port(s) 116 of the manifold 110 against the tube 174 and/or the air-piloted valve 172 of the second stage manifold 170. The gasket 176 can include: a sheet gasket, a rubber gasket, a silicone gasket, a plastic gasket, a metal gasket, or any other suitable type of gasket and/or seal.

2.8 Specific Examples of the System

In a first example of the system 100, the system 100 includes a pressure sensor support 152, a printed circuit board assembly (PCBA) 140, a cover 150, a pressure sensor 130, and a solenoid valve 120. The pressure sensor support 152 is incorporated into the pressure sensor port 113 of the manifold 110 as a set of snaps, and retains the pressure sensor 130 while withstanding any pressure force pushing on the pressure sensor 130. The PCBA 140 is retained by a set of snaps molded into the manifold 110. Each solenoid valve 120 forms a radial seal between a barrel 122 and a respective interior of the injection-molded plastic port 111. Each valve 120 has a vertically extending connector 126, and is soldered directly to the PCBA 140 along with each pressure sensor 130. A connector housing 156 is molded into the manifold 110, and includes an external connector 149. Portions of the pins of the external connector 149 extend upwards, parallel to the connector 126 and pressure sensor connector 132 of the valve 120 and pressure sensor 130, respectively. The PCBA 140 is located and retained by a number of snaps, tabs and slots 154 in the manifold 110, and receives the pins of the external connector 149, the valve connector 126, and the pressure sensor connector 132 in a single common plane. This enables the aforementioned pins and connectors to be electrically connected (e.g., soldered) to the PCBA 140 in a single assembly step, without changing the orientation of the assembly. The cover 150 is affixed to the manifold 110 by welding, and welding is performed by linear vibration welding. The valve 120 can be used to actuate one or more air-piloted valves 172 in a second stage manifold 170. Each valve 120 is located in the cavity 115 of the manifold 110, and has an open frame and coil assembly. The operating voltage of the electronics module 140 is 8 to 16 V. However, the system can include any suitable set of components in any other suitable configuration.

In a second example of the system 100, the system 100 includes a pressure sensor support 152, a printed circuit board assembly (PCBA) 140, a cover 150, a pressure sensor 130, and a solenoid valve 120. A pressure sensor support 152 extends towards the PCBA 140 from the interior of the cover 150, and retains both the pressure sensor 130 and the PCBA 140 while withstanding any pressure force pushing on the pressure sensor 130. The PCBA 140 has 19 mm of clearance above the front portion of the PCBA 140 and 6 mm of clearance above the rear portion of the PCBA 140 between the PCBA 140 and the cover 150. The PCBA 140 has 2 mm of clearance beneath it, between the PCBA 140 and the manifold 110, as well as 1.5 mm of clearance around the perimeter of the PCBA 140. Each solenoid valve 120 forms a radial seal between a 2.8 mm barrel 122 and a respective interior of the injection-molded plastic port 111. Each valve 120 has a 30 mm long flying lead with a Japan Solderless Terminal (JST) connector 126, and each pressure sensor 130 is soldered directly to the PCBA 140. The PCBA 140 is located and retained by the pressure sensors 130 as well as a number of tabs and slots 154 in the cover 150. There are at least three variations of the solenoid valve 120, each built on the same winding bobbin, injection-molded body parts, and stamped steel frame, and varying the size of the molded orifice, the coil winding, and other internal components. The first variation of the valve 120 is a two-way, normally closed, direct acting solenoid valve with a 1.5 mm orifice. The second variation of the valve 120 is a two-way, normally closed, pressure-balanced direct acting solenoid valve with a 4 mm orifice. The third variation of the valve 120 is a three-way, normally closed pilot solenoid valve with a 0.5 mm orifice. The third variation of the valve 120 can be used to actuate one or more air-piloted valves 172 in a second stage manifold 170. Each valve 120 is located in the cavity 115 of the manifold 110, and has an open frame and coil assembly. The operating voltage of the electronics module 140 is 8 to 16 V. However, the system can include any suitable set of components in any other suitable configuration.

The system 100 can include any other suitable elements configured to control pressurized airflow, provide mechanical support to internal or external components, mount (couple, connect, affix) the system 100 to related systems (e.g., a vehicle or part of a vehicle), transfer data or electrical power between elements of the system 100 and externally connected systems or components, attach services requiring a source or sink of compressed air or fluid (e.g., fittings), and couple various elements of the system 100 to one another. Furthermore, as a person skilled in the art will recognize from the previous detailed description and from the figures, modifications and changes can be made to the system 100 without departing from the scope of the system 100.

3. Method of Manufacture

Figure 19:
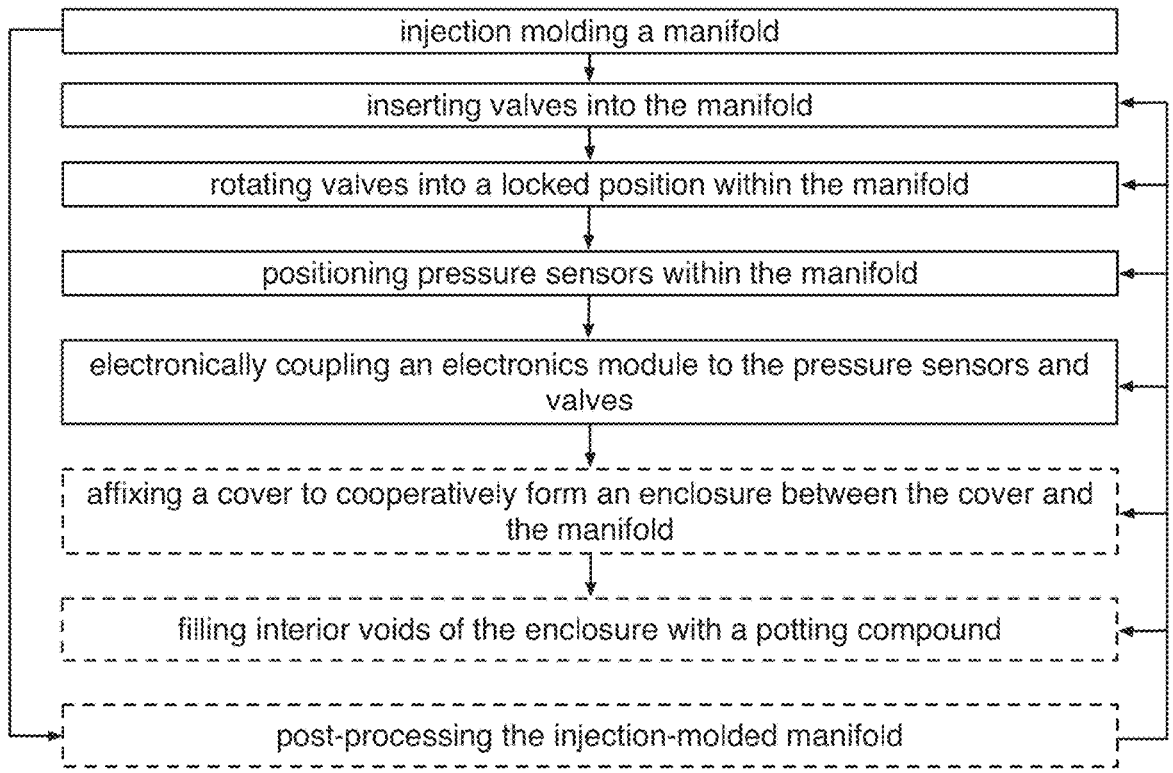
FIG. 19 depicts a block diagram of an example embodiment of a method of manufacture of the system.
Figure 20:
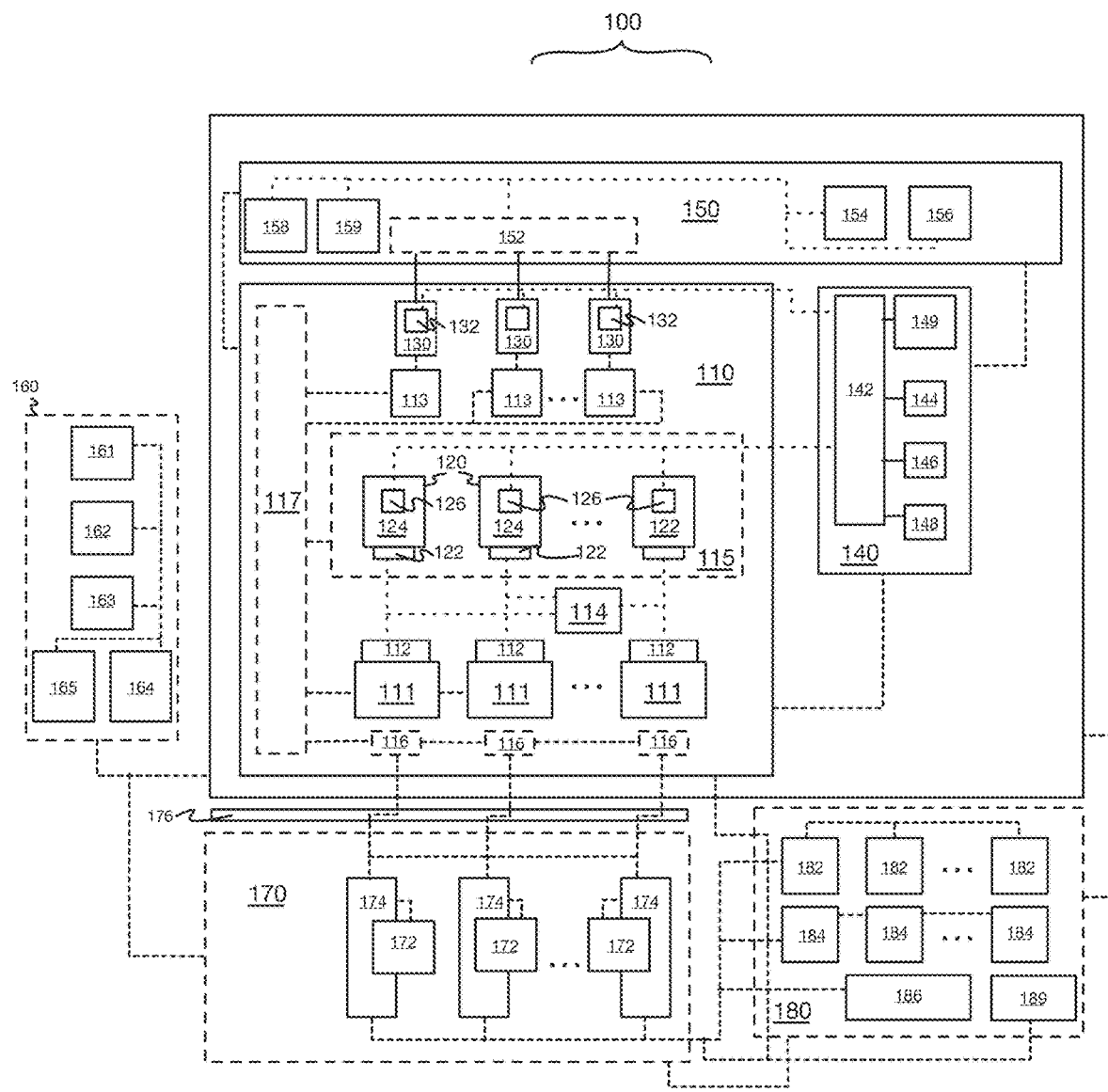
FIG. 20 depicts a schematic of an example embodiment of the system.

As shown in FIG. 19, an embodiment of a method 200 for manufacturing an electronically controlled air suspension system includes: injection-molding a manifold; inserting valves into the manifold; positioning pressure sensors within the manifold; and electronically coupling an electronics module to the pressure sensors and valves. The method 200 can additionally or alternatively include: rotating valves into a locked position within the manifold; affixing a cover to cooperatively form an enclosure between the cover and the manifold; filling interior voids of the enclosure with a potting compound; and post-processing the injection-molded manifold. An electronically controlled air suspension system is preferably a system such as the system 100 described above, but can alternatively be any suitable system. Injection-molding the manifold can include: splitting the cross section of the manifold mold along the centerline of the manifold, parallel to the first and second broad faces of the manifold; and molding the manifold to form webbing between a set of discharge ports 111 defined by the manifold, to facilitate material flow during injection molding and provide mechanical strength to the final component. Electronically coupling the electronics module to the pressure sensors and valves can include: aligning any electrical connectors of the pressure sensors and the valves in a common direction, coaxially aligning the electrical connectors of the pressure sensors and the valves and a set of through-holes in the electronics module, and soldering the electrical connectors of the pressure sensors and the valves to the electronics module at the set of through-holes. In one variation, system assembly can occur concurrently with component electrical connection. In one example, the PCBA can be assembled using top-down assembly, wherein PCBA assembly to the manifold can concurrently connect the pressure sensors and solenoid valves to the PCBA. However, the system can be otherwise assembled. Soldering is preferably performed as a single simultaneous or sequential operation, enabled by the electrical connectors all sharing a common direction and passing through a common plane, but can alternatively be otherwise performed. However, the system can be otherwise manufactured.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 22A:
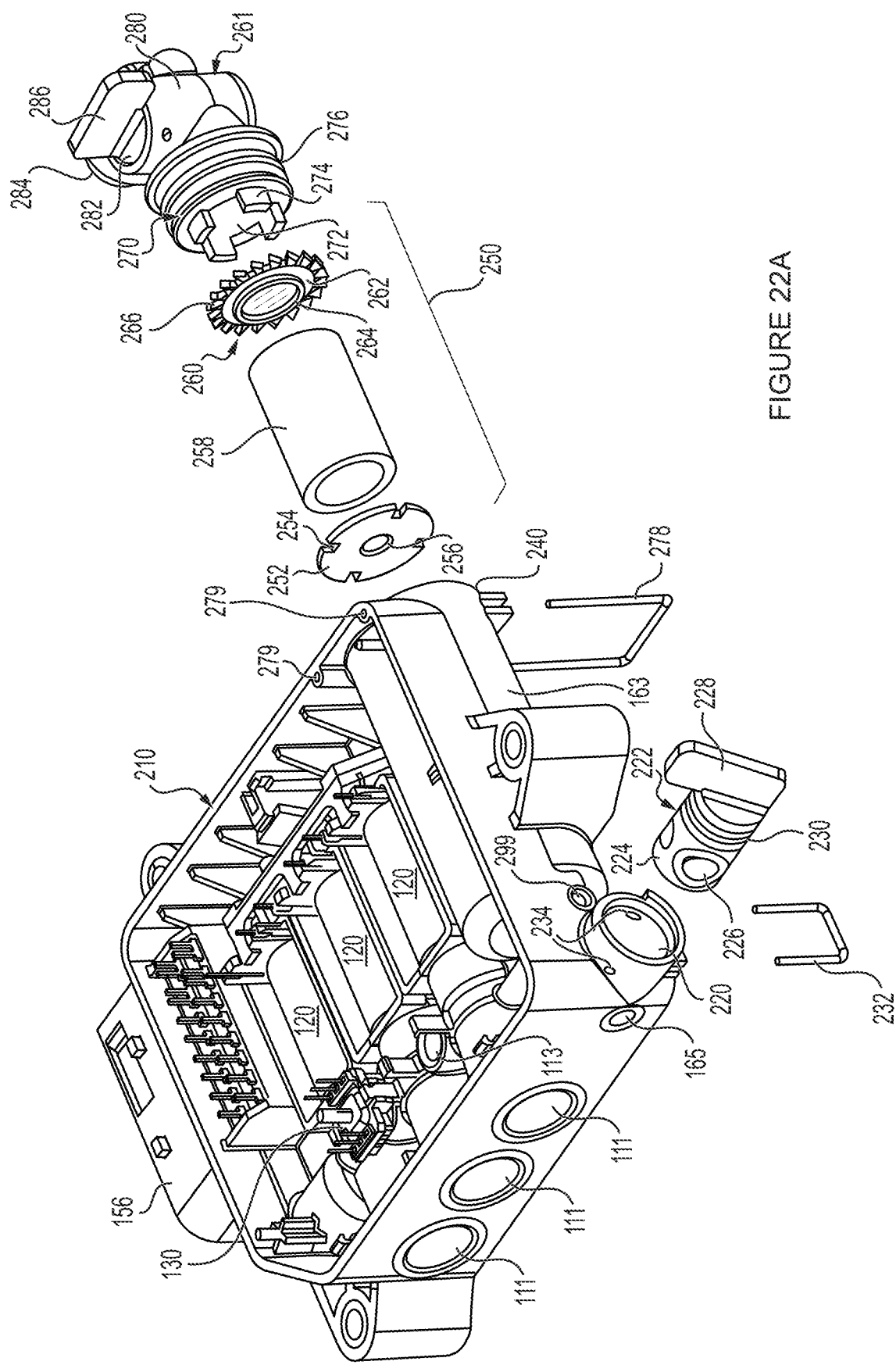
FIG. 22A depicts a perspective view of a second manifold of the present disclosure with an exploded view showing components of a filter assembly thereof.
Figure 22B:
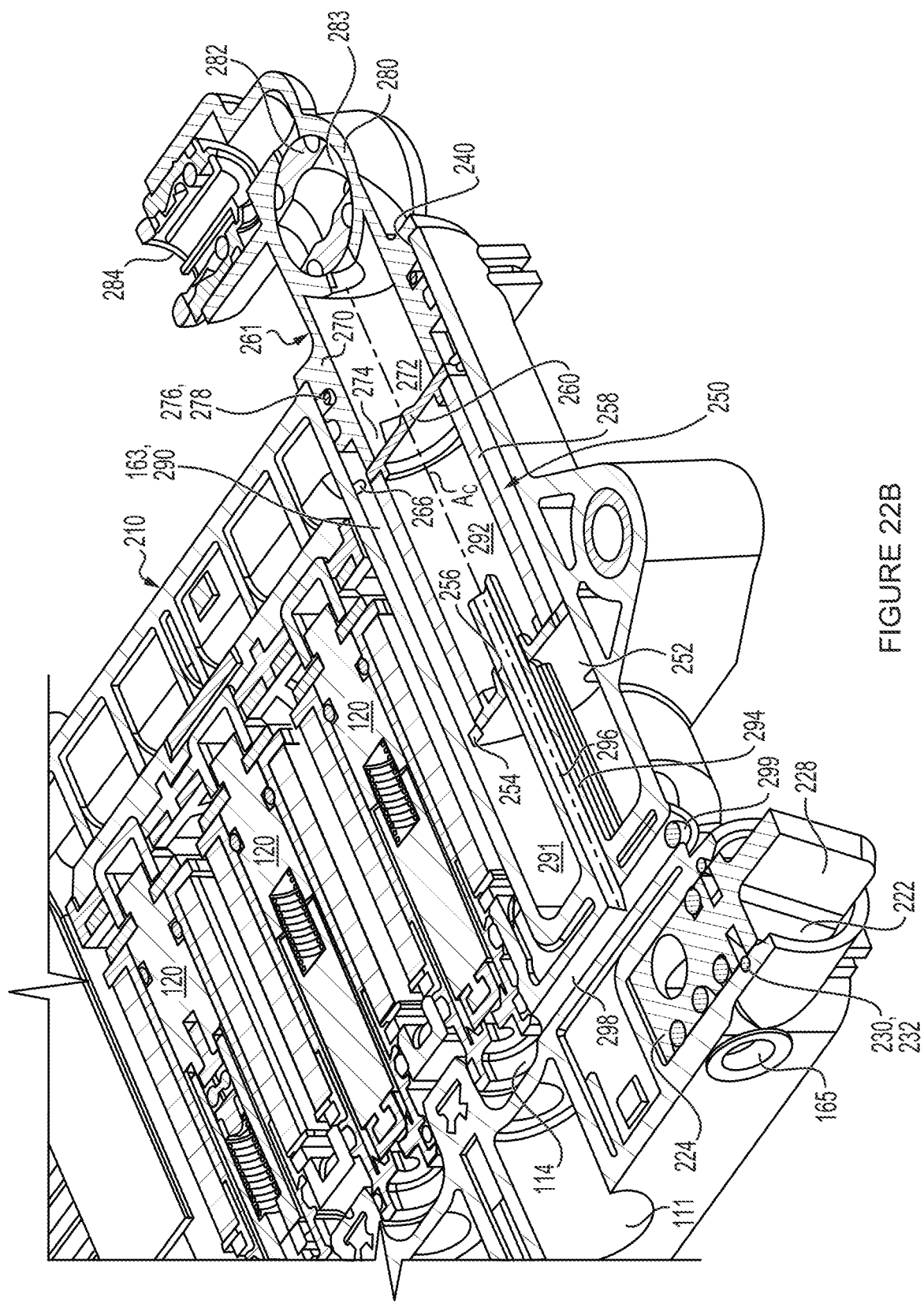
FIG. 22B depicts a cut-away view of the second manifold of FIG. 22A.

FIGS. 22A-22C show a second manifold 210 of the present disclosure, including a filter assembly 250. The second manifold 210 includes three discharge ports 111 and three actuators 120, with each of the actuators 120 configured to selectively control fluid communication between the channel 114 and a corresponding one of the discharge ports 111. The second manifold 210 may be similar or identical to the manifold 110, except for the differences described herein and shown in FIGS. 22A-22C. The second manifold 210 may be used for controlling airflow in an air suspension system. The second manifold 210 may be used in other applications and/or to supply other pneumatic devices in a vehicle, such as for controlling tire inflation.

The second manifold 210 defines a purge valve bore 220 configured to receive a purge valve assembly 222 that is configured to selectively control fluid flow between the expansion chamber 163 and the drain port 165 for removing moisture and/or other contaminants removed by the filter assembly 250. The purge valve assembly 222 includes a purge valve body 224 having a cylindrical shape and defining a purge valve passage 226. The purge valve body 224 is rotatable within the purge valve bore 220 to selectively align the purge valve passage 226 with the drain port 165 to control fluid flow therethrough between the expansion chamber 163 and the drain port 165. The purge valve body 224 includes a purge body tab 228 that protrudes from the second manifold 210 for rotating the purge valve body 224. For example, the purge body tab 228 may be rotated by fingers of a user and/or a rotary actuator for rotating the purge valve body 224 and thereby controlling fluid flow through the purge valve assembly 222.

The purge valve body 224 defines a purge retainer slot 230 annularly about an outer surface thereof. The purge retainer slot 230 is configured to receive a purge body retainer 232 for holding the purge valve body 224 within the second manifold 210. As best shown in FIG. 22A, the purge body retainer 232 has a U-shape and may be made of metal, such as stainless steel. However, the purge body retainer 232 may be made of another suitable material. The second manifold 210 defines a pair of purge retainer holes 234 intersecting the purge valve bore 220 perpendicular to an axis thereof and adjacent to an edge thereof for receiving the purge body retainer 232 and for holding the purge valve body 224 within the second manifold 210.

As shown in FIG. 22B, the expansion chamber 163 has a cylindrical shape and defines a chamber axis $A_C$, which extends substantially coplanar with the flow axis of one or more of the discharge ports 111. For example, the chamber axis $A_C$ may extend in a common plane with the flow axes of the discharge ports 111. Alternatively, the chamber axis $A_C$ may extend parallel to and spaced apart by a small distance, such as a few millimeters, from a common plane defined by the flow axes of the discharge ports 111. It may be critical for the expansion chamber 163, or a passageway extending therefrom, to intersect a plane defined by the flow axes of one or more of the discharge ports 111 for providing fluid communication between the expansion chamber 163 and the channel 114.

The filter assembly 250 is disposed in the expansion chamber 163 and includes a filter outlet disc 252 having a disc shape with a plurality of notches 254 in a peripheral edge thereof. The filter outlet disc 252 also includes a central bore 256 extending therethrough. The filter assembly 250 also includes a filter member 258 having a tubular shape and which is disposed coaxially with the chamber axis $A_C$. The filter outlet disc 252 is covers an axial end of the filter member 258 and protrudes radially outwardly beyond an outer surface of the filter member 258. The filter assembly 250 also includes a filter input disc 260 that covers an axial end of the filter member 258 opposite the filter outlet disc 252. The filter outlet disc 252 and the filter input disc 260 may, together, hold the filter member 258 in position within the expansion chamber 163.

The second manifold 210 also includes a filter cap assembly 261 with an integrated supply valve for controlling fluid flow from a source, such as an air compressor, into the filter assembly 250. The filter cap assembly 261 includes a filter cap body 270 integrally formed with a supply valve body 280, enclosing an end of the expansion chamber 163 and selectively removable from the second manifold 210 to provide access to the filter assembly 250. For example, the filter cap assembly 261 may be removable from the second manifold 210 to enable service of one or more components of the filter assembly 250, such as cleaning or replacement of the filter member 258. The filter cap assembly 261 also includes an input port 284 configured to receive a fluid connection to a compressed air source. The input port 284 may include, for example, a pneumatic fitting configured to engage and retain a plastic air line with an airtight connection.

The supply valve body 280 defines a supply valve bore having a cylindrical shape configured to receive a supply valve member 282 that is configured to selectively control fluid flow between the input port 284 and the expansion chamber 163. The supply valve member 282 has a cylindrical shape and defines a supply valve passage 283. The supply valve member 282 is rotatable within the supply valve body 280 to selectively align the supply valve passage 283 with the input port 284 to control fluid flow therethrough between the input port 284 and the expansion chamber 163. The supply valve member 282 includes a supply valve tab 286 that protrudes from the supply valve body 280 for rotating the supply valve member 282. For example, the supply valve tab 286 may be rotated by fingers of a user and/or a rotary actuator for rotating the supply valve member 282, and thereby controlling fluid flow through the supply valve body 280.

The filter cap body 270 defines an input passage 272 providing fluid communication from the supply valve body 280 into the expansion chamber 163. The filter cap body 270 also defines a plurality of castellations 274 disposed at regular angular intervals and annularly about the input passage 272. As best shown in FIG. 22A, the filter cap body 270 also defines a cap retainer slot 276 annularly about an outer surface thereof. The cap retainer slot 276 is configured to receive a filter cap retainer 278 for holding filter cap assembly 261 within the second manifold 210. The filter cap retainer 278 has a U-shape and may be made of metal, such as stainless steel. However, the filter cap retainer 278 may be made of another suitable material. The second manifold 210 defines a pair of cap retainer holes 279 intersecting the expansion chamber 163 perpendicular to an axis thereof and adjacent to an edge thereof for receiving the filter cap retainer 278 and for holding the filter cap assembly 261 within the second manifold 210.

The filter input disc 260 has a solid central portion with a disc shape that covers the input passage 272 of the filter cap body 270 and thereby forces air from the input port 284 to be directed radially outwardly between the castellations 274. The filter input disc 260 also includes a plurality of angled blades 266 disposed annularly about the solid central portion that agitates and/or imparts a rotation in air passing therethrough. The filter input disc 260 also defines a regaining ring 264 that protrudes from a surface thereof for holding the filter member 258 in a position coaxially within the expansion chamber 163 and spaced apart from an inner surface thereof.

As best shown in FIG. 22B, the expansion chamber 163 includes an annular chamber 290, a collection chamber 291, and an interior chamber 292. The filter member 258 separates the annular chamber 290, which extends annularly thereabout, from the interior chamber 292. The filter outlet disc 252 separates each of the annular chamber 290 and the interior chamber 292 from the collection chamber 291. The notches 254 in the filter outlet disc 252 provide fluid communication between the annular chamber 290 and the collection chamber 291. Moisture and other contaminants, such as dust, which cannot pass through the filter member 258 may be collected in the collection chamber 291 until the moisture and other contaminants can be removed by the purge valve assembly 222.

The purge valve assembly 222 may be opened in a purge operation to provide fluid flow between the expansion chamber 163 and the drain port 165. In some embodiments, the purge operation may be initiated when water and/or debris builds-up in the collection chamber 291. For example, the purge valve assembly 222 may be operated as an automatic purge, such as using a float-bowl style actuator. Additionally or alternatively, the purge operation may be initiated in response to an internal differential pressure exceeding a threshold value. In other words, the purge operation may be automatically initiated based on a pressure differential. One or more solenoid valves within the within the second manifold 210 may be actuated to provide such a pressure differential and to thereby force the purge valve assembly 222 to perform the purge operation. Additionally or alternatively, the purge operation may be initiated manually. For example, a person may grip the purge body tab 228 with two or more fingers and manually rotate the purge valve body 224 to an open position. The person may also manually stop the purge operation by gripping the purge body tab 228 and rotating the purge valve body 224 to a closed position, thereby re-scaling the system.

As shown in FIGS. 22B and 22C, the second manifold 210 also includes an input tube 294 that extends into the expansion chamber 163 and coaxially therewith. The input tube 294 extends through the collection chamber 291 and through the central bore 256 of the filter outlet disc 252. The input tube 294 has a tubular shape defining a first input passage 296 in fluid communication with the interior chamber 292. The second manifold 210 also defines a second input passage 298 that extends perpendicular to and intersecting the first input passage 296. Together, the first input passage 296 and the second input passage 298 provide fluid communication between the interior chamber 292 of the filter assembly 250 and the channel 114. As shown in FIG. 22B, the first input passage 296 intersects the second input passage 298 at a right angle and with a T-shape. A plug 299 closes an end of the second input passage 298 opposite from the channel 114.

In operation, air enters the second manifold 210 via the input port 284 and passes through supply valve body 280 and into the input passage 272. The air is then directed radially outwardly, through the angled blades 266 and into the annular chamber 290. The air then flows from the annular chamber 290, through the filter member 258 and into the interior chamber 292, as filtered air. The filtered air exits from the interior chamber 292 via the first input passage 296 and the second input passage 298 and into the channel 114, where it is directed through one or more of the discharge ports 111 via actuation of the actuators 120.

Figure 23A:
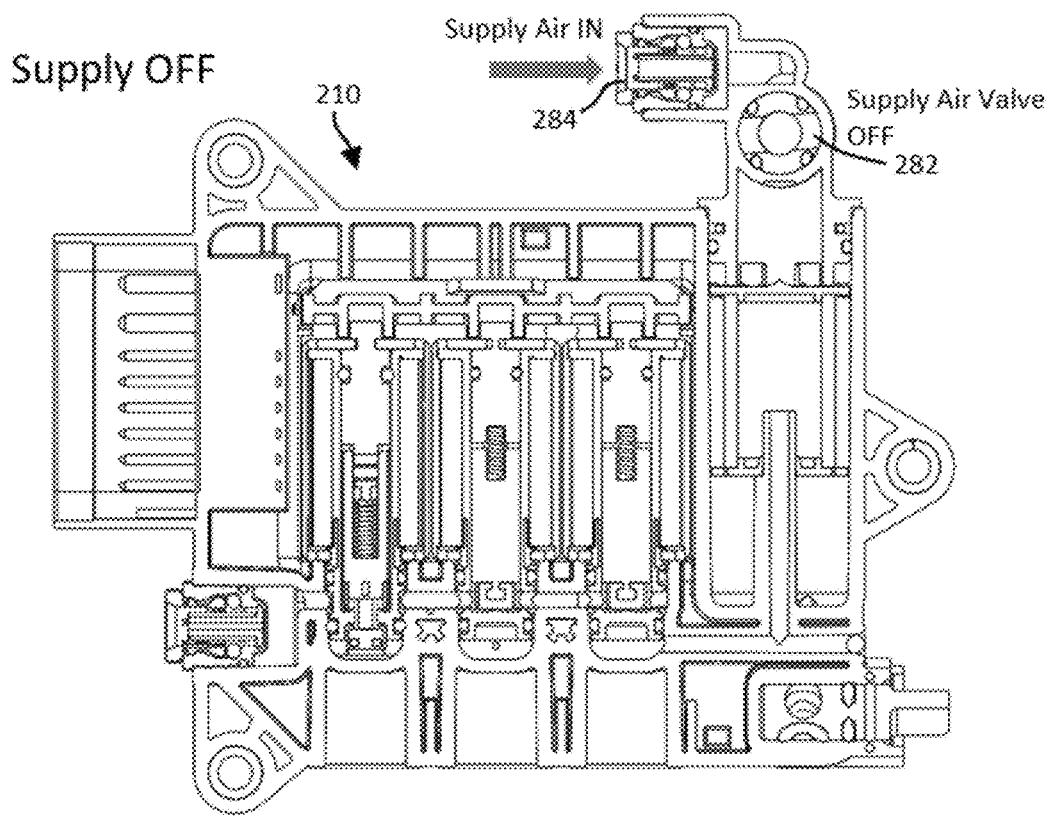
FIG. 23A shows a schematic diagram of the second manifold in a supply OFF mode.
Figure 23B:
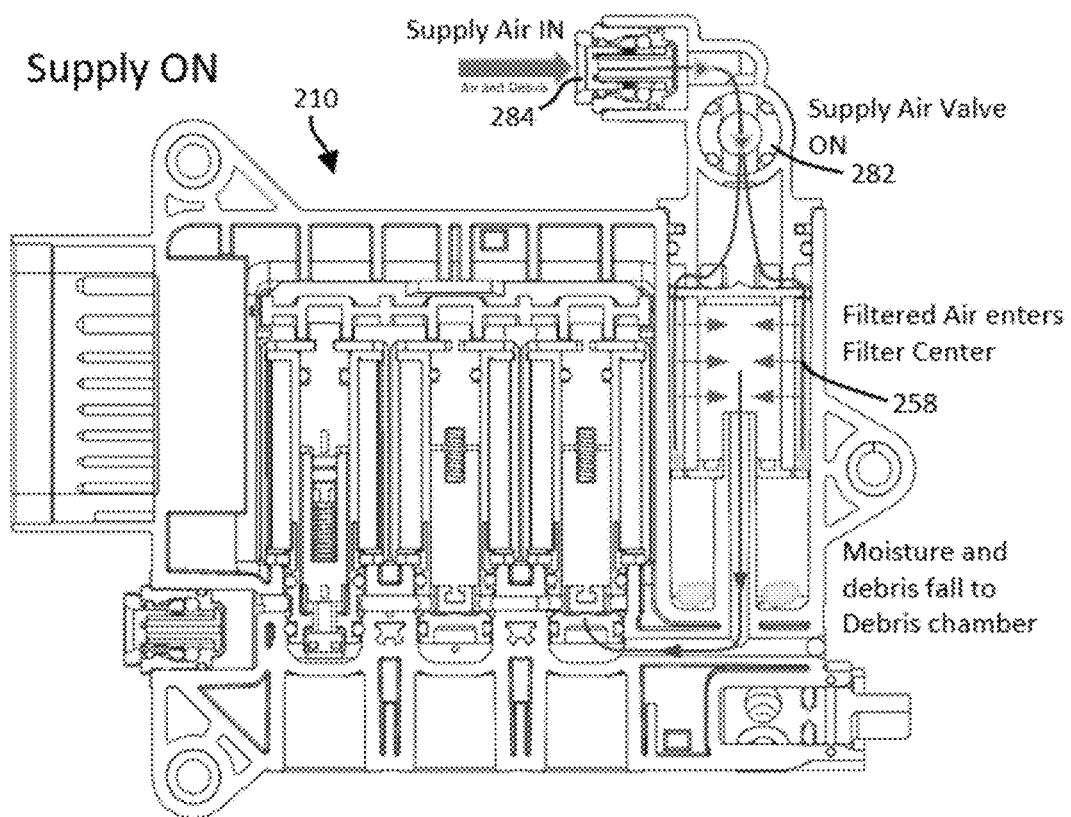
FIG. 23B shows a schematic diagram of the second manifold in a supply ON mode.
Figure 23C:
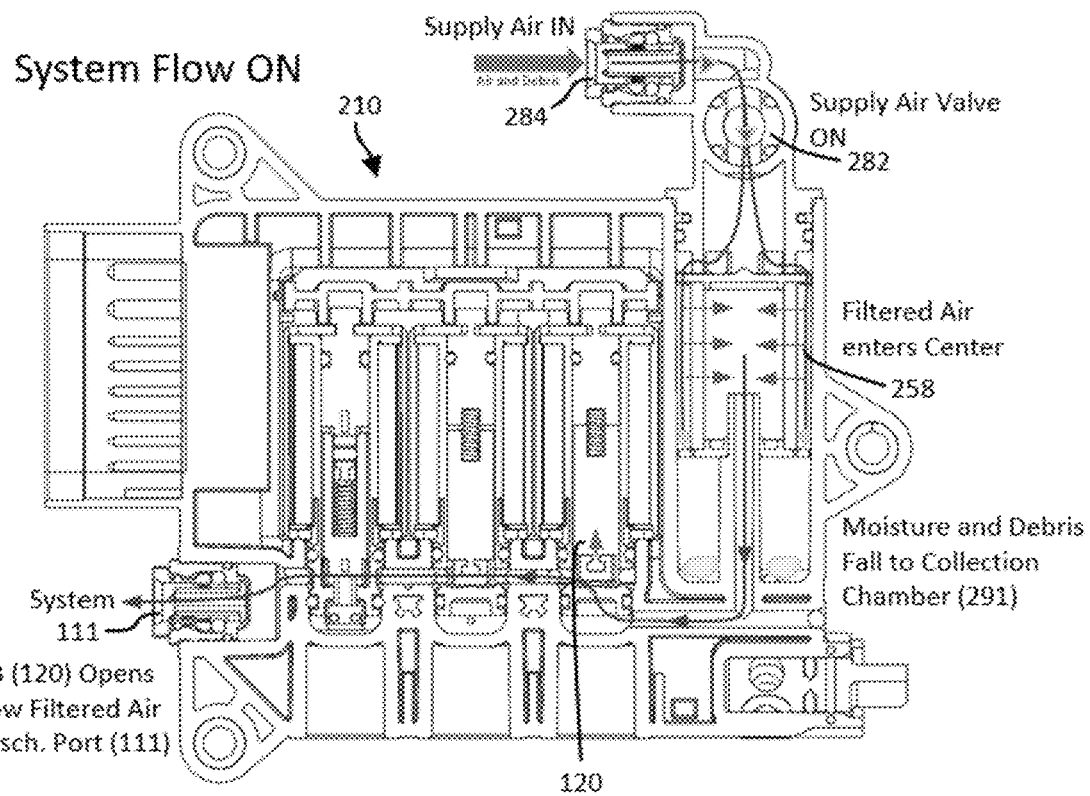
FIG. 23C shows a schematic diagram of the second manifold in a system flow ON mode.
Figure 23D:
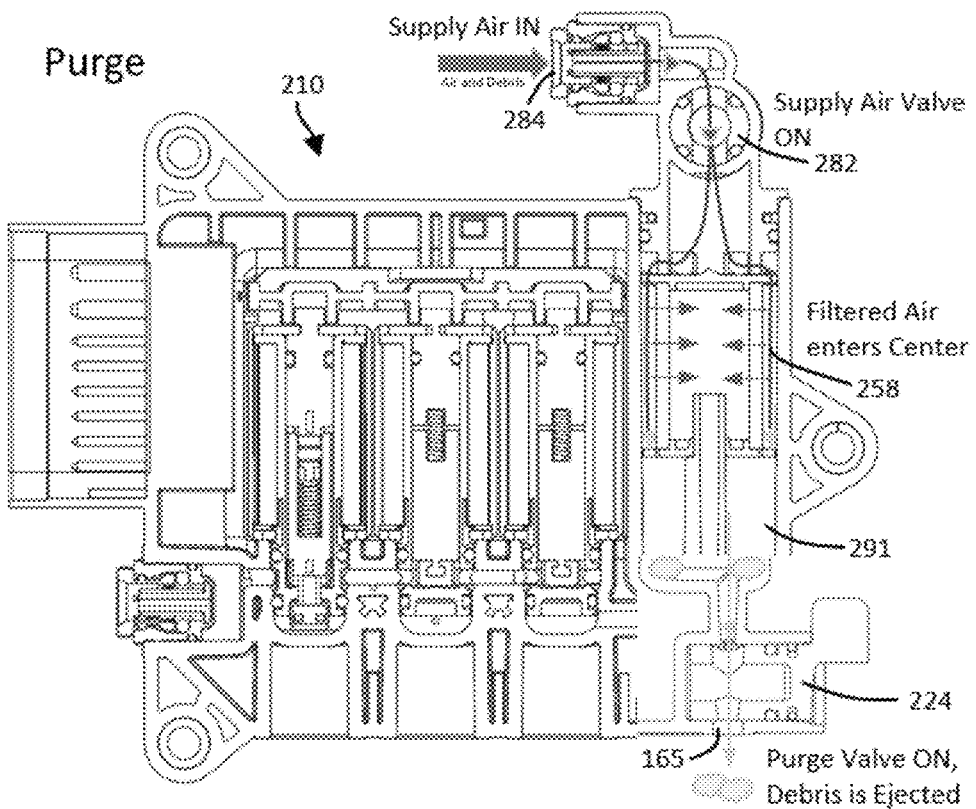
FIG. 23D shows a schematic diagram of the second manifold in a purge mode.

FIGS. 23A-23D show schematic diagrams of the diagram of the second manifold 210 in various different operating modes. FIG. 23A shows the second manifold 210 in a supply OFF mode, with the supply valve member 282 in a closed position to block fluid flow from the input port 284 into the second manifold 210. FIG. 23B shows the second manifold 210 in a supply ON mode, with the supply valve member 282 in an opened position to allow fluid flow from the input port 284 into the second manifold 210. FIG. 23C shows a schematic diagram of the second manifold in a system flow ON mode, with one the supply valve member 282 and one of the actuators 120 each opened to allow airflow from the input port 284, through the filter member 258, and out one of the discharge ports 111. FIG. 23D shows the second manifold 210 in a purge mode, with the purge valve body 224 in an opened position to allow fluid flow from the collection chamber 291 out of the drain port 165 to eject debris and moisture collected in the collection chamber 291.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tire inflation control system for a vehicle, comprising:
   a manifold defining: a channel configured to be connected to a fluid source, and a discharge port configured to be connected to one or more tires of a vehicle;
   an actuator configured to selectively control fluid communication between the channel and the discharge port;
   a pressure sensor configured to measure a fluid pressure in the discharge port; and
   an electronics module in communication with the pressure sensor and configured to command the actuator to selectively control fluid communication between the channel and the discharge port and based on the fluid pressure in the discharge port, and to thereby control inflation of the one or more tires connected to the discharge port.

2. The tire inflation control system of claim 1, further comprising a second pressure sensor configured to measure a fluid pressure in the channel, and
wherein the electronics module is in communication with the second pressure sensor and is configured to command the actuator to selectively control fluid communication between the channel and the discharge port further based on the fluid pressure in the channel.

3. The tire inflation control system of claim 1, wherein the manifold further defines an expansion chamber having a chamber axis and extending between the fluid source and the channel, and
wherein the inflation control system further includes a filter member disposed in the expansion chamber.

4. The tire inflation control system of claim 3, wherein the filter member has a tubular shape disposed coaxially with the chamber axis.

5. The tire inflation control system of claim 4, further comprising a filter input disc that covers an axial end of the filter member.

6. The tire inflation control system of claim 1, wherein the actuator includes a solenoid valve, and
wherein the inflation control system further includes a second solenoid valve configured to selectively control fluid communication between the channel and a second discharge port.

7. The tire inflation control system of claim 6, wherein the manifold further defines:
a first port and a second port, each of the first port and the second port defining a flow axis extending between a first and second end and a receiving region at the second end, wherein the first and second ports are arranged with the respective flow axes in a common plane,
wherein the channel intersects the first port and the second port between the first and second ends of each port, and
wherein the solenoid valve and the second solenoid valve are coaxially arranged with the first and second ports, respectively.

8. The tire inflation control system of claim 1, wherein the manifold further defines:
a first port and a second port, each of the first port and the second port defining a flow axis extending between a first and second end and a receiving region at the second end, wherein the first and second ports are arranged with the respective flow axes in a common plane, and
wherein the electronics module is arranged parallel the common plane.

9. The tire inflation control system of claim 1, wherein the actuator includes a solenoid valve having a connector,
wherein the pressure sensor includes electrical leads, and
wherein the electronics module is configured to receive and electrically couple to the electrical leads of the pressure sensor and the connectors of the solenoid valve.

10. A tire inflation control system for a vehicle, comprising:
a tire;
a manifold defining: a channel configured to be connected to a fluid source, and a discharge port in fluid communication with the tire;
an actuator configured to selectively control fluid communication between the channel and the discharge port;
a pressure sensor configured to measure a fluid pressure in the discharge port; and
an electronics module in communication with the pressure sensor and configured to command the actuator to selectively control fluid communication between the channel and the discharge port and based on the fluid pressure in the discharge port, and to thereby control inflation of the tire.

11. The tire inflation control system of claim 10, further comprising a second pressure sensor configured to measure a fluid pressure in the channel, and
wherein the electronics module is in communication with the second pressure sensor and is configured to command the actuator to selectively control fluid communication between the channel and the discharge port further based on the fluid pressure in the channel.

12. The tire inflation control system of claim 10, wherein the manifold further defines an expansion chamber having a chamber axis and extending between the fluid source and the channel, and
wherein the inflation control system further includes a filter member disposed in the expansion chamber.

13. The tire inflation control system of claim 10, wherein the actuator includes a solenoid valve, and
wherein the inflation control system further includes a second solenoid valve configured to selectively control fluid communication between the channel and a second discharge port.

14. The tire inflation control system of claim 13, wherein the manifold further defines:
a first port and a second port, each of the first port and the second port defining a flow axis extending between a first and second end and a receiving region at the second end, wherein the first and second ports are arranged with the respective flow axes in a common plane,
wherein the channel intersects the first port and the second port between the first and second ends of each port, and
wherein the solenoid valve and the second solenoid valve are coaxially arranged with the first and second ports, respectively.

15. The tire inflation control system of claim 10, wherein the manifold further defines:
a first port and a second port, each of the first port and the second port defining a flow axis extending between a first and second end and a receiving region at the second end, wherein the first and second ports are arranged with the respective flow axes in a common plane, and
wherein the electronics module is arranged parallel the common plane.

16. A tire inflation controller for a vehicle, comprising:
a manifold defining: a channel configured to be connected to a fluid source, a pressure sensor port, and a discharge port configured to be connected to one or more tires of a vehicle;
an actuator configured to selectively control fluid communication between the channel and the discharge port;
a pressure sensor arranged within the pressure sensor port and configured to measure a fluid pressure in the discharge port; and
an electronics module in communication with the pressure sensor and configured to command the actuator to selectively control fluid communication between the channel and the discharge port and based on the fluid pressure in the discharge port, and to thereby control inflation of the one or more tires connected to the discharge port.

17. The tire inflation controller of claim 16, further comprising a second pressure sensor configured to measure a fluid pressure in the channel, and wherein the electronics module is in communication with the second pressure sensor and is configured to command the actuator to selectively control fluid communication between the channel and the discharge port further based on the fluid pressure in the channel.

18. The tire inflation controller of claim 16, wherein the manifold further defines: a first port and a second port, each of the first port and the second port defining a flow axis extending between a first and second end and a receiving region at the second end, wherein the first and second ports are arranged with the respective flow axes in a common plane, and wherein the electronics module is arranged parallel the common plane.

19. The tire inflation controller of claim 16, wherein the actuator includes a solenoid valve, and wherein the tire inflation controller further includes a second solenoid valve configured to selectively control fluid communication between the channel and a second discharge port.

20. The tire inflation controller of claim 16, wherein the electronics module is electrically connected to each of the pressure sensor and the actuator via connectors configured to maintain mechanical and thermal isolation between the actuator and the electronics module.

* * * * *